(12) United States Patent
Aurongzeb et al.

(10) Patent No.: US 11,748,291 B2
(45) Date of Patent: Sep. 5, 2023

(54) SYSTEM AND METHOD FOR FABRICATING AND EXECUTING A WIRELESS GAMING KEYBOARD AND MOUSE ADAPTER SYSTEM

(71) Applicant: Dell Products, LP, Round Rock, TX (US)

(72) Inventors: Deeder M. Aurongzeb, Austin, TX (US); Peng Lip Goh, Singapore (SG)

(73) Assignee: Dell Products, LP, Round Rock, TX (US)

( * ) Notice: Subject to any disclaimer, the term of this patent is extended or adjusted under 35 U.S.C. 154(b) by 261 days.

(21) Appl. No.: 17/342,407

(22) Filed: Jun. 8, 2021

(65) Prior Publication Data

US 2022/0391344 A1  Dec. 8, 2022

(51) Int. Cl.
  *G06F 13/40* (2006.01)
  *G06F 3/023* (2006.01)
  (Continued)

(52) U.S. Cl.
  CPC ........ *G06F 13/4081* (2013.01); *A63F 13/327* (2014.09); *G06F 3/0231* (2013.01);
  (Continued)

(58) Field of Classification Search
  CPC ...... G06F 13/327; G06F 13/33; G06F 13/332; G06F 13/335; G06F 13/34; G06F 13/35;
  (Continued)

(56) References Cited

U.S. PATENT DOCUMENTS 6,524,189 B1  2/2003 Rautila
6,684,062 B1  1/2004 Gosior
(Continued)

OTHER PUBLICATIONS

Abner Li, "Google rolling out wireless Stadia Controller support on the web," May 5, 2020, 6 pages, https://9to5google.com/2020/05/05/stadia-controller-wireless-web/.
(Continued)

*Primary Examiner* — Raymond N Phan
(74) *Attorney, Agent, or Firm* — Prol Intellectual Property Law, PLLC; H. Kenneth Prol

(57) ABSTRACT

A wireless gaming keyboard and mouse adapter system may comprise a wireless gaming keyboard and mouse adapter housing, forming a dongle operably coupled to an input device, within which an electrical circuit and an antenna are embedded within a plurality crystal polymer layers for housing a network interface device, a USB-C adapter mounting, and a controller, which may be electrically coupled via the electrical circuit, and where the network interface device is electrically coupled to the antenna. The controller may receive input/output gaming instructions for the gaming software application, via the USB-C adapter, from an input device for a remote information handling system executing the gaming software application, and may execute wireless gaming keyboard and mouse adapter system code instructions to direct the network interface device to transceive the input/output gaming instructions to a cloud-based gaming application server via the wireless network Access Point (AP) at frequencies above 24 GHz.

20 Claims, 16 Drawing Sheets

(51) Int. Cl.
*G06F 3/0354* (2013.01)
*H01Q 21/06* (2006.01)
*G06F 3/038* (2013.01)
*A63F 13/327* (2014.01)
*H01Q 21/00* (2006.01)
*H04B 7/0413* (2017.01)

(52) U.S. Cl.
CPC .......... *G06F 3/038* (2013.01); *G06F 3/03543* (2013.01); *H01Q 21/0087* (2013.01); *H01Q 21/065* (2013.01); *H04B 7/0413* (2013.01)

(58) Field of Classification Search
CPC ...... G06F 13/352; G06F 13/358; G06F 13/40; G06F 13/42; G06F 13/422; G06F 13/4081; G06F 13/4068; G06F 13/4095; G06F 3/0231; G06F 3/03543; G06F 3/038
See application file for complete search history.

(56) References Cited

U.S. PATENT DOCUMENTS

| | | | | |
|---|---|---|---|---|
| 8,438,319 | B1* | 5/2013 | Edney | H05K 7/10 |
| | | | | 710/17 |
| 8,462,750 | B2 | 6/2013 | Sylvain | |
| 8,814,691 | B2 | 8/2014 | Haddick | |
| 9,227,142 | B2* | 1/2016 | Ikeda | A63F 13/215 |
| 9,595,767 | B2 | 3/2017 | Choudhury | |
| 2006/0143317 | A1* | 6/2006 | Shie | G06F 3/0231 |
| | | | | 710/8 |
| 2006/0253625 | A1* | 11/2006 | Lou | G06F 3/03543 |
| | | | | 710/62 |
| 2012/0235881 | A1 | 9/2012 | Pan | |

OTHER PUBLICATIONS

Abtec, Inc., "Plastic Injection Molding Materials & Thermoplastics," Apr. 7, 2021, 5 pages, https://www.abtecinc.com/custom-plastic-injection-molding/materials/.

James Rathburn—HSIO Technologies, "New Liquid Crystal Polymer Enable High-Speed Circuit Fabrication," Dec. 10, 2014, 17 pages, https://www.eeweb.com/new-liquid-crystal-polymer-enables-high-speed-circuit-fabrication/.

Leslie Gordon—MachineDesign, "Injection-Molding Liquid-Crystal Polymers," Mar. 2, 2011, 12 pages, https://www.machinedesign.com/news/article/21829584/injectionmolding-liquidcrystal-polymers.

Nokia, "Delivering a monetizable 5G service: cloud gaming," Apr. 7, 2021, 5 pages https://www. nokia.com/networks/5g/gaming/.

Telia Company, 5G for Esports Tested, Feb. 7, 2018, 2 pages, https://www.teliacompany.com/en/news/news-articles/2018/5g-speeds-for-esports-tested/.

Jay Peters—The Verge, "Google Stadia tests 4G and 5G game streaming," Jul. 28, 2020, 2 pages, https://www.theverge.com/2020/7/28/21345365/google-stadia-4g-lte-5g-cellular-network-connection-experiment.

* cited by examiner

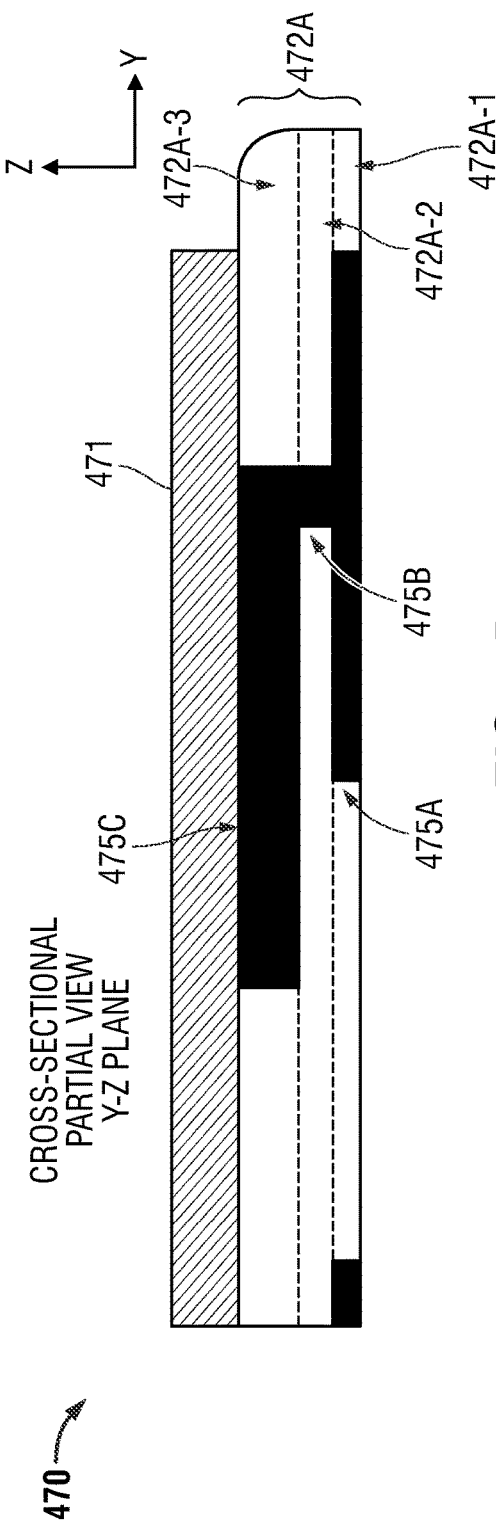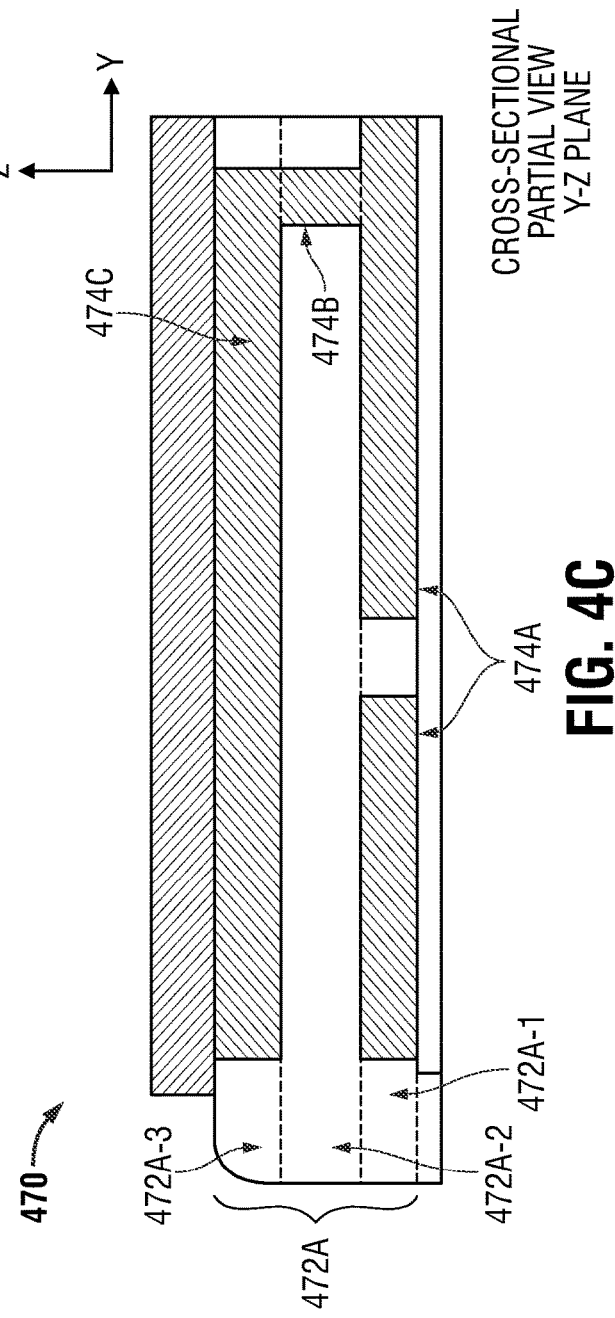

SYSTEM AND METHOD FOR FABRICATING AND EXECUTING A WIRELESS GAMING KEYBOARD AND MOUSE ADAPTER SYSTEM

FIELD OF THE DISCLOSURE

The present disclosure generally relates to information handling systems receiving input/output gaming instructions for a gaming software application via an input/output device. More specifically, the present disclosure relates to communication of such input/output gaming instructions via the wireless network through a wireless gaming keyboard and mouse adapter.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication via a 3GPP wireless network, WiFi, or other wireless networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4B is a graphical illustration of a cross-sectional view of an antenna embedded within a wireless gaming keyboard or mouse adapter according to an embodiment of the present disclosure;

FIG. 4C is a graphical illustration of a cross-sectional view of an electrical circuit embedded within a wireless gaming keyboard or mouse adapter according to an embodiment of the present disclosure;

The use of the same reference symbols in different drawings may indicate similar or identical items.

DETAILED DESCRIPTION OF THE DRAWINGS

Figure 1:
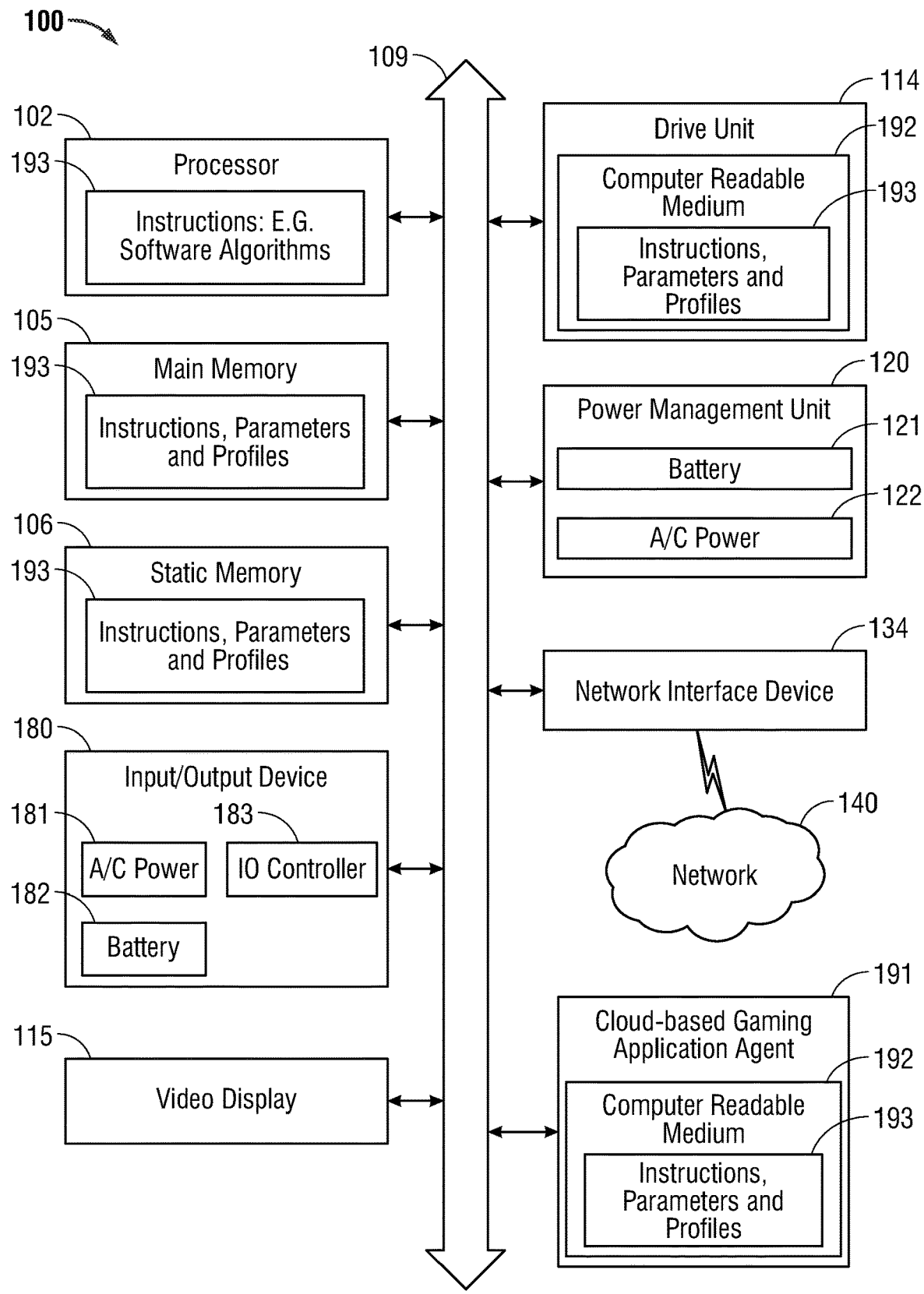
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In recent years, online computer gaming, in which multiple players engage in a communal gaming experience through a network connecting each of the players' information handling systems has increased greatly in popularity. Quality of these players' gaming experiences depend heavily on the ability of the gaming software application executing at each of the players' information handling systems to reflect the players' input/output gaming instructions in real time, or as close to real time as possible. A player's input, for example, may come in the form of an avatar viewable by other players taking a specific action on another avatar, character, or item in the surrounding environment that is also viewable by other players, pursuant to input/output gaming instructions provided by a player to her information handling system via a peripheral input/output device such as a keyboard, mouse, virtual reality headset, joystick, or other handheld gaming controller. When the gaming software application's reflection of such a player's input/output gaming instructions (e.g., action of her avatar) lags behind the input of such instructions, each of the players may experience a disjointed chronology of events. For example, during the time between a player's input of such input/output gaming instructions and the application's reflection of those instructions, the other avatar, character, or aspect of the surrounding environment upon which the player intended to act may have moved, died, disappeared, or transformed, such that the action the player intended to invoke by providing the input/output gaming instructions is negated. This is only one example of the types of frustrations players may experience as a consequence of lag between input of such input/output gaming instructions and execution of such input/output gaming instructions by the gaming software application.

Computer gaming software applications initially came to popularity prior to the advent of the internet, and thus were designed for individual play by a single player at that player's information handling system. Such traditional computer gaming software applications also involved the receipt of input/output gaming instructions via a keyboard, mouse, or other input/output device (e.g., joystick). Because these early computer gaming software applications were designed to execute only a single information handling system, rather than across a network of information handling systems, the applications involved the information handling system receiving input/output gaming instructions directly from the mouse, keyboard, or other peripheral input/output device attached to the information handling system.

With the shift of computing resources to the cloud, many computer gaming software applications have evolved to execute a large portion of the gaming software application at a cloud-based server located remotely from each of the players' information handling systems. In such systems, each of the players' information handling systems may be tasked primarily with the display of a gaming environment, while generation of the gaming environment is delegated to the cloud-based server. Thus, processing of input/output gaming instructions for manipulation of any of the player's avatars and the effects of those manipulations on other avatars, characters, or items within the gaming environment may occur at the cloud-based server, rather than at any of the players' information handling systems.

In such a cloud-based gaming environment, when a player's information handling system receives that player's input/output gaming instructions from a peripherally attached input/output device, the player's information handling system must then transmit the received input/output gaming instructions to the cloud-based server for processing. In other words, the player's information handling system in such a cloud-based architecture may serve as an intermediate and ultimately unnecessary stop between the peripherally attached input/output device and the cloud-based server. Such an unnecessary intermediate stop may further increase lag between the player's input of such input/output gaming instructions via the peripherally attached input/output device and processing of those input/output gaming instructions at the cloud-based server. As described above, this type of lag may impact player experience. Thus, a method for removing this intermediate hop and allowing for more direct transmission of player input/output gaming instructions from the peripheral input/output device to the cloud-based server is needed.

The wireless gaming keyboard and mouse adapter system in embodiments described herein may address these issues by coupling a wireless adapter to a gaming keyboard or a gaming mouse to enable communication of player input/output gaming instructions received via the gaming keyboard or gaming mouse to the cloud-based server through a wireless network. This may omit communication of such input/output gaming instructions to the players' information handling systems displaying the gaming environment, and thus avoid any lag associated with such an unnecessary hop. Further, use of the wireless network, and more specifically, the higher frequency bands available according to the New Radio (NR) Frequency Range 2 (FR2) standard (e.g., above 24 GHz), may further decrease lag by transmitting the input/output gaming instructions at frequencies (e.g., 5G mmWave frequencies within 24-100 GHz) unused by other nearby electrical components such as the players' information handling system or Wi-Fi networks. Wireless links transceiving at these higher frequencies may experience higher quality of service, less latency, higher throughput, and fewer dropped packets, for example, than wireless links established according to existing or earlier generation wireless communication standards such as Wi-Fi, 4G, 3G, 2G, or 1G cellular communications. Transmission of input/output gaming instructions at frequencies within the NR FR1 standard (e.g., below 6 GHz) may present similar advantages because the lower frequency range below 6 GHz is also largely unused according to previous standards. However, antennas may be capable of transmitting input/output gaming instructions over greater distances within the NR FR1 standard than within frequencies associated with the NR FR2 standard.

A wireless gaming keyboard and mouse adapter in embodiments described herein may comprise an adapter housing enclosing a Universal Serial Bus (USB)-C adapter mounting, a network interface device, and a controller, among other electrical components (e.g., memory). The USB-C adapter mounting in embodiments may couple with a USB-C adapter that inserts into a USB-C adapter incorporated within either a gaming keyboard or a gaming mouse. The network interface device in embodiments described herein may establish wireless links with a wireless network Access Point (AP) to transceive information, such as received player input/output gaming instructions for peripheral controllers. The controller in embodiments may execute code instructions of a wireless gaming keyboard and mouse adapter system to direct the network interface device to transmit such player input/output gaming instructions received from the gaming keyboard or gaming mouse via the USB-C connection. In order for the controller to receive the player input/output gaming instructions from the USB-C connection and to direct operation of the network interface device in such a way, the controller, USB-C adapter mounting, and network interface device in embodiments may be electrically coupled to one another via one or more electrical circuits. Further, in order for the network interface device to transmit received player input/output gaming instructions to the wireless network AP at the direction of the controller, the network interface device may be electrically coupled to an antenna capable of transceiving data at frequencies above 24 GHz.

Existing methods for fabrication of integrated circuit and form-factor antennas may not be suitable for use in fabrication of wireless gaming keyboard and mouse adapters described in embodiments herein. For example, because the wireless gaming keyboard and mouse adapter described herein may mate directly with a gaming keyboard or a gaming mouse, or be incorporated within the exterior housing of a gaming keyboard or a gaming mouse, there exists a need to limit the size of such a wireless gaming keyboard and mouse adapter. Such size constraints may warrant layering of the electrical circuit or antenna into a plurality of vertical stacked portions (e.g., stacked vertically atop the electrical components housed within the housing), resulting in less consumption of exterior surface area, for example. Many methods for fabrication of integrated circuits and form-factor wireless antennas existing today cannot accommodate these limited size constraints.

Thus, the wireless gaming keyboard and mouse adapter in embodiments described herein may be fabricated to incorporate an electrical circuit and an antenna within the housing of the adapter itself using etched liquid crystal polymers (LCP). The LCP material comprising the housing in embodiments may provide high insulation, high fluidity during molding, high heat, chemical, oil, and gas tolerance, dimensional stability, flatness, and high stiffness in comparison with existing materials used in integrated circuits. Also of great importance, the LCP material may withstand reflow soldering and laser etching without distorting, melting, or blistering. This may allow for more precise etching and injection of liquid metals such as copper within the etched LCP material than can be achieved with more traditional integrated circuit materials.

Embodiments of the present disclosure describe fabrication of a face plate for the wireless gaming keyboard and mouse adapter housing comprising multiple layers of LCP material. For example, a face plate may comprise an inner LCP layer situated closest to the electrical components housed within the housing, an intermediate LCP layer, and an outer LCP layer forming the exterior surface of the face plate. Other embodiments may include multiple outer layers, multiple intermediate layers, or an electro-magnetically transparent top layer adhered to the outer LCP layers for durability or appearance.

As described herein, size constraints may warrant layering of the electrical circuit or antenna into one or more of a plurality of vertical stacked portions. Thus, the fabrication method described herein may involve etching of the inner LCP layer to form an inner portion of a pattern for the electrical circuit electrically coupling the USB-C adapter mounting, the network interface device, and the controller, among other electrically components housed within the adapter housing. The inner circuit pattern may be filled with an electrically conductive material, such as copper. An intermediate LCP layer may be disposed atop the inner LCP layer. A plurality of vias may be ablated or etched through the thickness of the intermediate LCP layer to contact the electrically conductive material disposed within the inner circuit pattern. An outer LCP layer may be disposed atop the intermediate LCP layer. The outer LCP layer may be etched to form an outer antenna pattern and outer circuit pattern, each contacting electrically conductive material disposed within separate vias. The electrically conductive material may be disposed within the outer antenna pattern and the outer circuit pattern to form an antenna and an electrical circuit embedded within the plurality of LCP layers, respectively. The antenna may be capable of transmitting data at frequencies above 24 GHz. In such a way, the wireless gaming keyboard and mouse adapter housing face plate fabricated using such a method may comprise an embedded electrical circuit coupling the various electrical components housed within the housing to one another and an embedded wireless antenna for transmission of received player input/output gaming instructions.

In embodiments described herein, the wireless gaming keyboard and mouse adapter housing may be combined with a back plate to form a peripheral adapter (e.g., as a dongle) for mating to a gaming keyboard or gaming mouse or other peripheral device (e.g., virtual reality headset, joystick, hand-held controller, etc.), or may be incorporated within the exterior surface of a gaming keyboard or gaming mouse to form a wireless gaming keyboard or wireless gaming mouse. In embodiments, the USB-C adapter mounting may receive player input/output gaming instructions in the form of keystrokes, mouse movement, or mouse clicks via a USB-C connection with the keyboard or mouse controllers. The wireless gaming keyboard and mouse adapter controller may execute code instructions of a wireless gaming keyboard and mouse adapter system to retrieve these player input/output gaming instructions via the electrical circuit embedded within the adapter front plate, and instruct the network interface device, also via this electrical circuit or another electrical circuit embedded within the adapter front plate, to transmit the input/output gaming instructions to a cloud-based gaming server via a wireless network AP. The network interface device in embodiments may establish a wireless link with the wireless network AP via the antenna embedded within the adapter front plate and transmit these input/output gaming instructions via that wireless link to the wireless network AP. In such a way, the wireless gaming keyboard and mouse adapter system may enable transmission of input/output gaming instructions to a cloud-based gaming server, without communications through an intermediate information handling system, via an antenna embedded within an LCP face plate of a small form-factor adapter mated or incorporated directly to a gaming keyboard or a gaming mouse.

FIG. 1 illustrates an information handling system 100 operably connected to an input/output device 180 according to several aspects of the present disclosure. As described herein, with the shift of computing resources to the cloud, many computer gaming software applications have evolved to execute a large portion of the gaming software application at a cloud-based server located remotely from each of the players' information handling systems. Information handling system 100 may illustrate aspects of such a players' information handling system executing an agent 191 of the gaming software application that is orchestrated at a cloud-based server located within network 140 or may represent the cloud-based server or other information handling systems. In such an embodiment, the players' information handling system 100 may be tasked primarily with the display of a gaming environment via a video display 115. Manipulations of the information handling system 100 user's avatar may occur pursuant to input/output gaming instructions generated at the input/output device 180. In such a cloud-based environment, the processing of those input/output gaming instructions (e.g., generated at the input/output device 180) for manipulation of the information handling system 100 user's avatars and the effects of those manipulations on other avatars, characters, or items within the gaming environment may occur at the cloud-based server in network 140, rather than at the information handling system 100. Lag associated with unnecessary transmission of these input/output gaming instructions through the information handling system 100 to the network 140 may be avoided in an embodiment by directly transmitting the input/output gaming instructions generated at the input/output device 180 to the network 140, as described in greater detail with respect to FIG. 2.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The cloud-based gaming application agent 191 may execute code instructions to display a communal gaming environment via instructions received from the cloud-based gaming application server within network 140 in an embodiment. In another aspect of an embodiment, the cloud-based gaming application agent 191 may also operate to retrieve an IP address of the cloud-based gaming application server, and to transmit this IP address to the input/output device 180 via bus 109. As described in greater detail with respect to FIG. 2, the input/output device 180 in embodiments may transmit input/output gaming instructions generated at the input/output device 180 to the IP address received in such a manner.

The information handling system 100 may include a memory 105, (volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 102 illustrated in FIG. 1, hardware or software control logic, or any combination thereof. Additional components of the information handling system 100 may include one or more storage devices 106 or 114, one or more communications ports for communicating with external devices, as well as a power management unit 120 supplying power to the information handling system 100 via an alternating current (A/C) power adapter 122. The A/C power adapter 122 may receive power from the A/C power adapter 122 or battery 121, and may thus supply power to one or more components of the information handling system 100.

The information handling system 100 may also include one or more buses (e.g., 109) operable to transmit communications between the various hardware components. Portions of an information handling system 100 may themselves be considered information handling systems 100 in the embodiments presented herein. Information handling system 100 may include devices or modules that embody one or more of the devices or execute instructions for the one or more systems and modules described herein, and operates to perform one or more of the methods described herein. The information handling system 100 may execute code instructions 193 that may operate on servers or systems, remote data centers, or on-box in individual client information handling systems 100 according to various embodiments herein. In some embodiments, it is understood any or all portions of code instructions 193 may operate on a plurality of information handling systems 100.

The information handling system 100 may include a processor 102 such as a central processing unit (CPU), a GPU, embedded controllers or control logic or some combination of the same. Any of the processing resources may operate to execute code that is either firmware or software code. Moreover, the information handling system 100 may include memory such as main memory 105, static memory 106, containing computer readable medium 192 storing instructions 193. Instructions 193 may include an agent 191 for the cloud-based gaming application, operating system (OS) software, application software, BIOS software, or other software applications or drivers detectable by processor type 102. The disk drive unit 114 and static memory 106 may also contain space for data storage. The instructions 193 in an embodiment may reside completely, or at least partially, within the main memory 105, the static memory 106, and/or within the disk drive 114 during execution by the processor 102. The information handling system 100 may also include one or more buses 109 operable to transmit communications between the various hardware components such as between power management unit 120, the network interface device 134, or the like.

The input/output device 180 may be a keyboard, mouse, virtual reality headset, joystick, handheld controller, or any other currently known or later developed input device. The input/output device 180 may incorporate an input/output controller 183, which may operate to detect actuation of one or more mechanical, electrical, or electromagnetic devices, as they are physically manipulated by a user. For example, the input/output device controller 183 in an embodiment may include a keyboard controller for detecting actuation of mechanical, electrical, or electromagnetic keys upon application by the user of downward force on such keys. As another example, the input/output device controller 183 in an embodiment may include a mouse for detecting rotation of a wheel housed at least partially within the mouse, detecting movement of the mouse with respect to the information handling system 100, detecting contact or movement of the user's finger on the surface of the mouse, or detecting downward force on one or more buttons or portions of the mouse's surface (e.g., as with right-click, or left-click input). As yet another example, the input/output device controller 183 in an embodiment may include a joystick or other gaming controller for detecting downward force by a user on a directionality interface (e.g., joystick, movement arrows, roller ball) indicating movement of a player's avatar or a cursor for selection of items displayed within a gaming environment. In still another example, the input/output device controller 183 in an embodiment may include a voice-activated interface or a gaze detection method for detecting interaction between the user's eye gaze and one or more portions of a gaming environment displayed, for example, via a virtual reality headset. The input/output device controller 183 in each of these embodiments, and other contemplated embodiments may operate to generate input/output gaming instructions, based on these detected actuations. For example, the input/output device controller 183 may detect actuation of a keyboard key associated with firing a weapon and consequently generate an input/output gaming instruction directing the player's avatar to fire a weapon within the gaming environment generated by the cloud-based gaming application server.

Video display 115 may function as a liquid crystal display (LCD), an organic light emitting diode (OLED), a flat panel display, a solid state display, or a head-mounted display device such as a virtual-reality headset. A head mounted display device may display images using, for example, a curved mirror based reflection, a waveguide based method or a light guide based method. Waveguide methods may further include, but may not be limited to diffraction optics, holographic optics, polarized optics, and reflective optics.

The network interface device 134 may provide connectivity of the information handling system 100 to the network 140 via a network AP in an embodiment. The network 140 in some embodiments may be a wired local area network (LAN), a wireless personal area network (WPAN), a public WiFi communication network, a private WiFi communication network, a public WiMAX communication network, or other non-cellular communication networks. In other embodiments, the network 140 may be a wired wide area network (WAN), a private LTE communication network, a 4G LTE public communication network, or a 5G millimeter-wave (mm-wave) communication network, or other cellular communication networks. Connectivity to any of a plurality of networks 140, one or more APs for those networks in an embodiment may be via wired or wireless connection. In some aspects of the present disclosure, the network interface device 134 may operate two or more wireless links. In other aspects of the present disclosure, the information handling system 100 may include a plurality of network interface devices, each capable of establishing a separate wireless link to network 140, such that the information handling system 100 may be in communication with network 140 via a plurality of wireless links.

The network interface device 134 may operate in accordance with any cellular wireless data communication standards. To communicate with a wireless local area network, standards including IEEE 802.11 WLAN standards, IEEE 802.15 WPAN standards, WiMAX, or similar wireless standards may be used. For example, IEEE 802.11 Wi-Fi standards may operate at 2.4 GHz or 5 GHz bands. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac, ax (e.g., center frequencies between 5.170-5.785 GHz). It is understood that any number of available channels may be available under the 5 GHz shared communication frequency band. WLAN, for example, may also operate at a 2.4 GHz band, or a 60 GHz band, according to the IEEE 802.11 ad/ax/ay standards (IEEE 802.11 ax may also be known as Wi-Fi6).

The network interface device 134 in other embodiments, may connect to any combination of macro-cellular wireless connections including 2G, 2.5G, 3G, 4G, 5G, or the like from one or more service providers. Utilization of radiofrequency communication bands according to several example embodiments of the present disclosure may include bands used with the WWAN standards, which may operate in both licensed and unlicensed spectrums, including the unlicensed spectrum above 60 GHz. More specifically, the network interface device 134 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. It is contemplated the network interface device 134 may transceive according to later developed standards, including 6G wireless technology.

Frequencies related to the wireless networks may include high frequency (HF) band, very high frequency (VHF) band, ultra-high frequency (UHF) band, L band, S band, C band, X band, Ku band, K band, Ka band, V band, W band, and millimeter wave bands. WWAN may use the Unlicensed National Information Infrastructure (U-NII) band which typically also may operate in the ~5 GHz frequency band. It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 193 or receives and executes instructions, parameters, and profiles 193 responsive to a propagated signal, so that a device connected to a network 140 may communicate voice, video or data over the network 140. Further, the instructions 193 may be transmitted or received over the network 140 via the network interface device 134. The information handling system 100 may include a set of instructions 193 that may be executed to cause the computer system to perform any one or more of the methods or computer-based functions disclosed herein. For example, instructions 193 may include a particular example of an agent of a cloud-based gaming application, or other aspects or components. Various software modules comprising application instructions 193 may be coordinated by an operating system (OS), and/or via an application programming interface (API). An example operating system may include Windows®, Android®, and other OS types. Example APIs may include Win 32, Core Java API, or Android APIs. Application instructions 193 may also include any application processing drivers, or the like executing on information handling system 100.

The agent 191 of the cloud-based gaming application may utilize a computer-readable medium 192 in which one or more sets of instructions 193 such as software may be embedded. The instructions 193 may embody one or more of the methods or logic as described herein. For example, instructions relating to the agent 191 for the cloud-based gaming application, software algorithms, processes, and/or methods may be stored here. Some or all of the cloud-based gaming application may be executed locally or remotely.

Main memory 105 may contain computer-readable medium (not shown), such as RAM in an example embodiment. An example of main memory 105 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions, parameters, and profiles 193 of the agent 191 for the cloud-based gaming application may be stored in static memory 106, or the drive unit 114 on a computer-readable medium 192 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
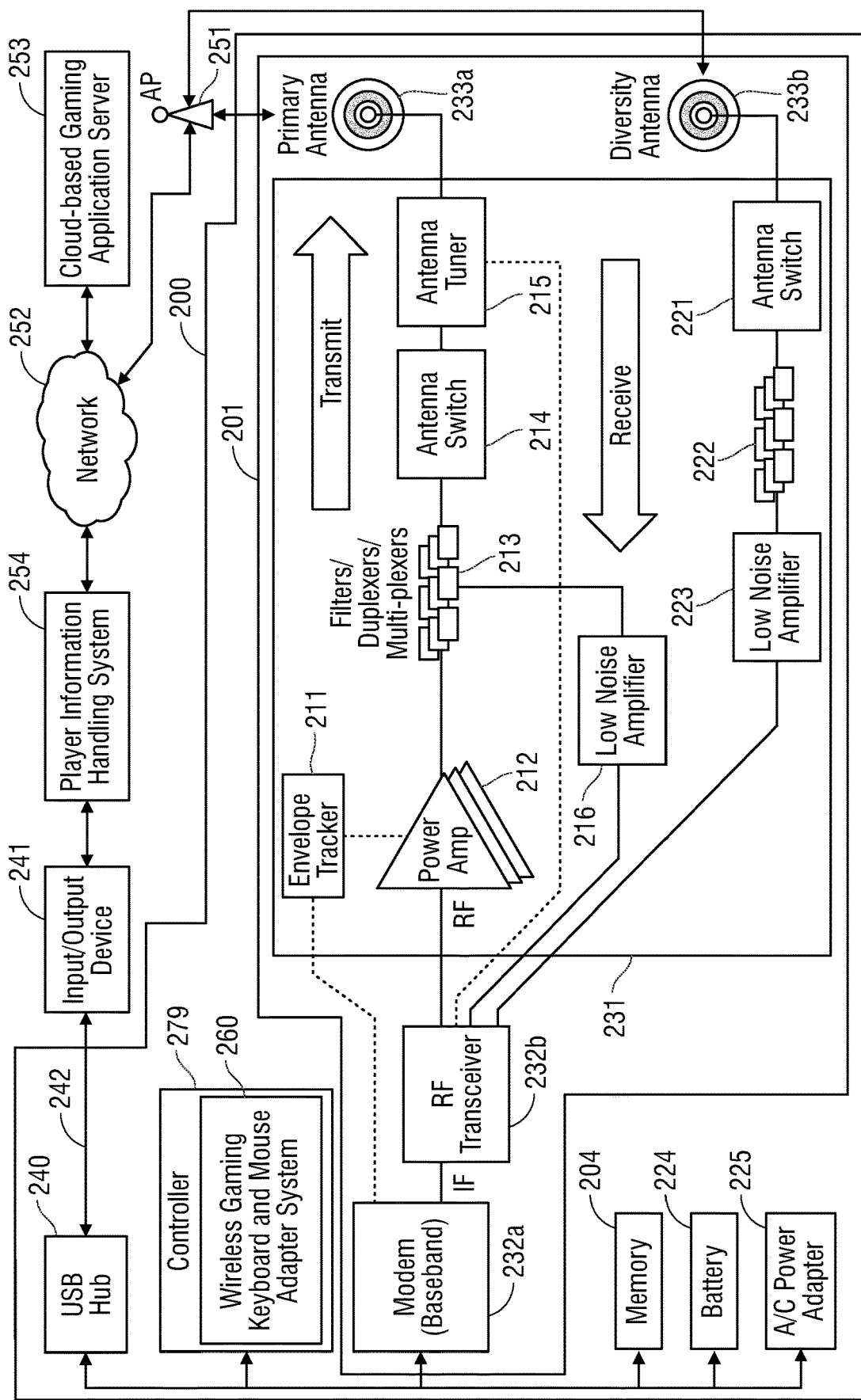
FIG. 2 is a block diagram illustrating a wireless gaming keyboard or mouse adapter for an input/output device according to an embodiment of the present disclosure.

FIG. 2 is a block diagram illustrating a wireless gaming keyboard or mouse adapter in communication with an input/output device and a cloud-based gaming application server according to an embodiment of the present disclosure. As described herein, the network interface device 201 may operate to transmit input/output gaming instructions received from a gaming keyboard or gaming mouse, such as input/output device 241 operatively coupled to the wireless gaming keyboard or mouse adapter to a cloud-based gaming server, via a wireless network AP 251. As also described herein, lag associated with unnecessary transmission of these input/output gaming instructions through the player information handling system 254 executing the gaming application agent to the network 252 may be avoided in an embodiment by directly transmitting the input/output gaming instructions generated at the input/output device 241 to the network 252, via the wireless gaming keyboard and mouse adapter 200.

In an embodiment, the wireless gaming keyboard and mouse adapter 200 may comprise one or more of a USB hub 240, a controller 279 executing code instructions of the wireless gaming keyboard and mouse adapter system 260, a network interface device 201, a memory, 204, a battery, 224, or an A/C power adapter 225. The wireless gaming keyboard and mouse adapter 200 in an embodiment may be any device or devices that execute instructions, parameter, and profiles 262. The coding instructions 262 of the wireless gaming keyboard and mouse adapter system 260 may, operate to retrieve input/output gaming instructions generated at the input/output device 241, and transmit those input/output gaming instructions to the cloud-based gaming application server 253 via the network interface device 201, AP 251, and network 252. The wireless gaming keyboard and mouse adapter system 260 in an embodiment may also operate to retrieve an IP address of the cloud-based gaming application server 253 from the player information handling system 254, via the input/output device 241. The wireless gaming keyboard and mouse adapter system 260 in such an embodiment may receive the IP address for the cloud-based gaming application server 253 via the wired Universal Serial Bus (USB) connection 242 to the input/output device 241, which may also be in communication with the player information handling system 254. As described above with respect to FIG. 1, for example, the cloud-based gaming application agent of the player information handling system 254 may retrieve the IP address via network 252.

As described above with reference to FIG. 1, an input/output controller for the input/output device 241 may operate to detect actuation of one or more mechanical, electrical, or electromagnetic devices, as they are physically manipulated by a user. Such input/output gaming instructions may be received from an input/output device 241 such as a gaming keyboard, gaming mouse, joystick, other handheld controller, or other currently known or later developed input/output device 241 for directing actions of a player avatar within a gaming environment at a USB hub 240 via a wired USB connection, or another type of data transfer wired connection, such as Serial Advanced Technology Attachment (SATA), firewire, or IEEE 1284 buses, for example. In an embodiment in which connection 242 is a USB connection, such a USB connection 242 may conform to any currently known or later developed USB protocols, including USB 1.0, 2.0, 3.0, or 3.1. In some embodiments, the USB connection 242 may operate according to the USB 3.1 protocol that allows for receipt of power at the hub 240 from the input/output device 241. This power may be transferred to the battery 224 or the power adapter 225 via an electrical circuit to provide power to the various components of the wireless gaming keyboard and mouse adapter 200, including the USB bus 240, the controller 279, the network interface device 201, or memory 204.

The wireless gaming keyboard and mouse adapter 200 may include a memory 204, (volatile (e.g. random-access memory, etc.), nonvolatile memory (read-only memory, flash memory etc.) or any combination thereof), one or more processing resources, such as a central processing unit (CPU), a graphics processing unit (GPU), or firmware operating within controller 279, or any combination thereof. Memory 204 in an embodiment may include, for example, semiconductor memory, such as Metal-Oxide Semiconductor (MOS) memory cells.

Wireless gaming keyboard and mouse adapter 200 may include devices or modules that embody one or more of the devices or execute instructions for the one or more systems and modules described herein, and operates to perform one or more of the methods described herein. The wireless gaming keyboard and mouse adapter 200 may execute code instructions 262 that may operate on controller 279, servers or systems, remote data centers, or on-box in individual wireless gaming keyboard and mouse adapters 200 according to various embodiments herein. In some embodiments, it is understood any or all portions of code instructions 262 may operate on a plurality of wireless gaming keyboard and mouse adapters 200.

The wireless gaming keyboard and mouse adapter 200 may include memory such as main memory 204, containing computer readable medium 261 storing instructions 262. Instructions 262 may include a wireless gaming keyboard and mouse adapter system 260, application software, BIOS software, or other software applications or drivers detectable by the controller 279. The instructions 262 in an embodiment may reside completely, or at least partially, within the main memory 204 during execution by the controller 279. The wireless gaming keyboard and mouse adapter 200 may also include one or more electrical circuits operable to transmit communications between the various hardware components such as between USB hub 112, controller 179, power management unit 123, the network interface device 134, or the like.

Main memory 204 may contain computer-readable medium (not shown), such as RAM in an example embodiment. An example of main memory 204 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

The present disclosure contemplates a computer-readable medium that includes instructions, parameters, and profiles 262 or receives and executes instructions, parameters, and profiles 262 responsive to a propagated signal, so that a device connected to a network 252 may communicate voice, video or data over the network 252. Further, the instructions 262 may be transmitted or received over the network 252 via the network interface device 201. The wireless gaming keyboard and mouse adapter 200 may include a set of instructions 262 that may be executed to cause the computer system to perform any one or more of the methods or computer-based functions disclosed herein. For example, instructions 262 may include a particular example of a wireless gaming keyboard and mouse adapter system 260, or other aspects or components. Application instructions 262 may also include any application processing drivers, or the like executing on wireless gaming keyboard and mouse adapter 200.

The wireless gaming keyboard and mouse adapter system 260 may utilize a computer-readable medium 261 in which one or more sets of instructions 262 such as software may be embedded. The instructions 262 may embody one or more of the methods or logic as described herein. For example, instructions relating to the wireless gaming keyboard and mouse adapter system 260, software algorithms, processes, and/or methods may be stored here. Some or all of the wireless gaming keyboard and mouse adapter system 260 may be executed locally or remotely.

A controller 279 for the wireless gaming keyboard and mouse adapter system may execute coding instructions 262 to retrieve input/output gaming instructions from the USB hub 240, and transmit those input/output gaming instructions, via an electrical circuit embedded within one or more LCP layers of the adapter housing to the modem 232a of the network interface device 201. Controller 279 in an embodiment may also transmit to the network interface device 201 the IP address and any other information needed by the network interface device 201 to establish a connection to the cloud-based gaming application server located within network 252. In an embodiment, the controller 279 may communicate with the network interface device 201 in such a way via a bus or an electrical circuit. In an embodiment, such an electrical circuit may further allow communication between or among two or more of the controller 279, network interface device 201, USB hub 240, memory 204, battery 224, or A/C adapter 225. Such an electrical circuit in some embodiments may be embedded within a liquid crystal polymer (LCP) layer of the adapter housing. The network interface device 201 may forward such input/output gaming instructions on to the network 252 via antennas 233a or 233b also embedded within the LCP layer of the adapter housing, as described herein.

A modem 232 of the network interface device 201 may receive these input/output gaming instructions from the controller 279 and modulate and transmit them in the form of an electrical signal to the radio frequency transceiver 232b via an intermediate frequency (IF) line. The network interface device 201 in an embodiment may comprise the modem 232a, an RF transceiver 232b, an antenna front end system 231, and one or more antennas. The radio frequency transceiver 232b in an embodiment may transmit radio frequency signals to carry the input/output gaming instructions received from the modem 232a. Such a modulated radio frequency signal may then be transmitted through a radio frequency (RF) line for the antenna front end system 231 of the network interface device 201. The antenna front end system 231 may operate to set signal transmission power levels or sensitivity to signal reception, select channels or frequency bands, amplify and conduct other functions in support of a wireless transmission from the information handling system to the communication network via one or more antennas (e.g., primary antenna 233a or diversity antenna 233b).

A power amplifier 212 of the antenna front end system 231 may set the signal transmission power level for the modulated signal received from the radio frequency transceiver 232b in an embodiment. The antenna front end system 231 in an embodiment may also include a packet tracker 211 receiving instructions from the modem 233a indicating a power supply voltage at which the amplifier should set the signal transmission power level for the modulated signal in order to ensure that the amplifier is operating at peak efficiency for power required at each instance of transmission. The envelope tracker 211 in an embodiment may thus direct the power amplifier 212 to set the signal transmission power level for the modulated signal according to the instructions received at the modem 232a. The antenna front end system 231 may further include one or more filters, or multiplexers 213 operating to condition the amplified and modulated signal for transmission according to one or more wireless communication standards. For example, such filters or multiplexers 213 may include bandpass filters for reducing image response and preventing strong out-of-band signals from saturating signals. As another example, such filters or multiplexers 213 may include time division multiplexers, or frequency division multiplexers, depending upon the wireless communication standard to which the amplified and modulate signal must adhere for transmission to the network. As yet another example, such filters or multiplexers 213 may include noise filters for stripping out noise contaminating the amplified and modulated signal or selecting channels. Following such a noise filtration, a filtered, amplified, and modulated signal may be transmitted to a low-noise amplifier 216 to amplify a signal weakened to sub-standard power levels during the noise filtration process. The low noise amplifier 216 may then transmit the re-amplified signal back to the RF transceiver 233b for remodulation and transmission back to the antenna front end system 231.

Upon modulating, amplification, and filtration or multiplexing of the signal carrying the input/output gaming instructions received at the modem 232a in an embodiment, an antenna switch 214 may select the best available antenna (e.g., primary antenna 233a or diversity antenna 233b) for the frequency band (e.g., in the mmWave range above 24 GHz) at which the signal may be transmitted. As described herein, one or more antennas may be embedded within the LCP face plate. For example, various embodiments contemplate at least the inclusion of a primary antenna 233a and a secondary or diversity antenna 233b, with one of the two antennas operating to transmit signals and the other of the two antennas operating to receive signals. In other embodiments, the primary antenna 233a may transmit and receive signals within a first frequency range and the secondary antenna 233b may transmit and receive signals within a second frequency range that does not overlap the first. Combinations of various numbers of such antennas are also contemplated in various embodiments. For example, various embodiments may incorporate 4×4 or 8×8 patch antenna arrays to enable multiple input multiple output (MIMO) and uplink MIMO communications.

The antenna switch 214 in an embodiment may determine whether to transmit the modulated, amplified, filtered, or multiplexed signal via the primary antenna 233a or the diversity antenna 233b in an example embodiment. An antenna tuner 215 may then match the load impedance of the radio to the combined input impedance of the transmission line operably connecting the antenna switch 214 to the antenna (e.g., primary antenna 233*a*) chosen by the switch 214 for transmission of the signal and the chosen antenna (e.g., primary antenna 233*a*). In an embodiment in which the antenna switch 214 has selected the primary antenna 233*a* for transmission of the signal modulated to carry the input/output gaming instructions received by the modem 232*a*, the primary antenna 233*a* may then transmit the modulated signal, including the input/output gaming instructions, to a network AP for delivery through that network to the cloud-based gaming application server.

Such a network 252 in some embodiments may be a wired local area network (LAN), a wireless personal area network (WPAN), a public WiFi communication network such as Wi-Fi 6 at 60 GHz, a private WiFi communication network such as Wi-Fi 6 at 60 GHz, a public WiMAX communication network, or other non-cellular communication networks. In other embodiments, the network 252 may be a wired wide area network (WAN), a private LTE communication network, a 4G LTE public communication network, or a 5G millimeter-wave (mm-wave) communication network, or other cellular communication networks. In other aspects of the present disclosure, the wireless gaming keyboard and mouse adapter 200 may include a plurality of network interface devices (e.g., 201), each capable of establishing a separate wireless link to a network 252, such that the adapter may be in communication with the network 252 via a plurality of wireless links.

The network interface device 201 may operate in accordance with any cellular wireless data communication standards. To communicate with a wireless local area network, standards including Wi-Fi 6, IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band, according to the IEEE 802.11 ad/ay standards.

The network interface device 201, in other embodiments, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums, including the unlicensed spectrum above 60 GHz. More specifically, the network interface device 201 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard.

Frequencies related to the wireless networks may include high frequency (HF) band, very high frequency (VHF) band, ultra-high frequency (UHF) band, L band, S band, C band, X band, Ku band, K band, Ka band, V band, W band, and millimeter wave bands. WWAN may use the Unlicensed National Information Infrastructure (U-NII) band which typically also may operate in the ~5 GHz frequency band. It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

The network interface device 201 may communicate input/output gaming instructions within any of these contemplated radio frequencies to a network 252 through an AP 251, which may forward the input/output gaming instructions to a remote gaming application server 253. Such a gaming application server 253 may control or orchestrate a community or shared gaming environment including a plurality of player avatars, with each player avatar controlled by a separate input/output device (e.g., 241). The gaming application server 253 may transmit display instructions for displaying the shared gaming environment to a player information handling system 254 via the network 252. As described above with respect to FIG. 1, the player information handling system (e.g., 100) may display (e.g., via video display 115) this shared gaming environment, which may include displaying avatars taking actions based on the input/output gaming instructions transmitted by the network interface device 201 to the cloud-based gaming application server 253. In some embodiments, two different networks may be used for communication between the cloud-based gaming application server 253 and the player information handling system 254, and between the cloud-based gaming application 253 and the network interface device 201.

The network interface device 201 may further operate to receive signals from such a network. For example, the cloud-based gaming server 253 in an embodiment may transmit haptic response instructions to a gaming input/output device 241 such as a gaming keyboard or gaming mouse correlating to an event occurring within the gaming environment hosted by the cloud-based gaming application server 253 pursuant to the input/output gaming instructions transmitted from the player's input/output device 241 to the cloud-based gaming server 253 via the wireless gaming keyboard and mouse adapter system. Such haptic response instructions may include an instruction to engage various haptic mechanisms (e.g., heating element, cooling element, piezo-electric actuators, fans, etc.) to provide haptic feedback (e.g., clicks, vibrations, pulses, temperature changes) in tandem with the display of the event occurring within the gaming environment. This is only one example of information that may be received at the network interface device 201 from the network 252 or the cloud-based gaming application server 253.

The network interface device 201 in an embodiment may receive a wireless signal at an antenna (e.g., diversity antenna 233*b*), and transmit this received signal to an antenna switch 221. In some embodiments, antenna switch 221 and antenna switch 214 may comprise the same or different mechanism. The antenna switch 221 in an embodiment may operate to forward the received signal to the filters or multiplexers 222, which may comprise the same or different mechanisms as filters or multiplexers 213. The filters or multiplexers 222 in an embodiment may operate to de-multiplex the received signal, according to the method used by the cloud-based gaming application server to multiplex the signal prior to transmission, or to perform noise filtration, for example. In an embodiment in which noise filtration has been performed, the signal may be transmitted to the low noise amplifier 223 which may comprise the same or different mechanism than low noise amplifier 216. In an embodiment in which noise filtration has not been performed, the signal may be transmitted directly to the RF transceiver 232b from the filters and multiplexers 222. The RF transceiver 232b in such an embodiment may demodulate the received signal and forward it on to the modem 232a for transmission to the controller 279 executing code instructions of the wireless gaming keyboard and mouse adapter system. For example, the network interface device 201 may forward received haptic feedback instructions to the input/output device 241 via an electrical circuit, the controller 279, the USB hub 240, and the USB-C connection. These haptic feedback instructions may direct the input/output device 241 to actuate some form of haptic feedback (e.g., a noise, click, vibration, pulse, increase or decrease in temperature, etc.) at the input/output device 241, for example.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

Figure 3A:
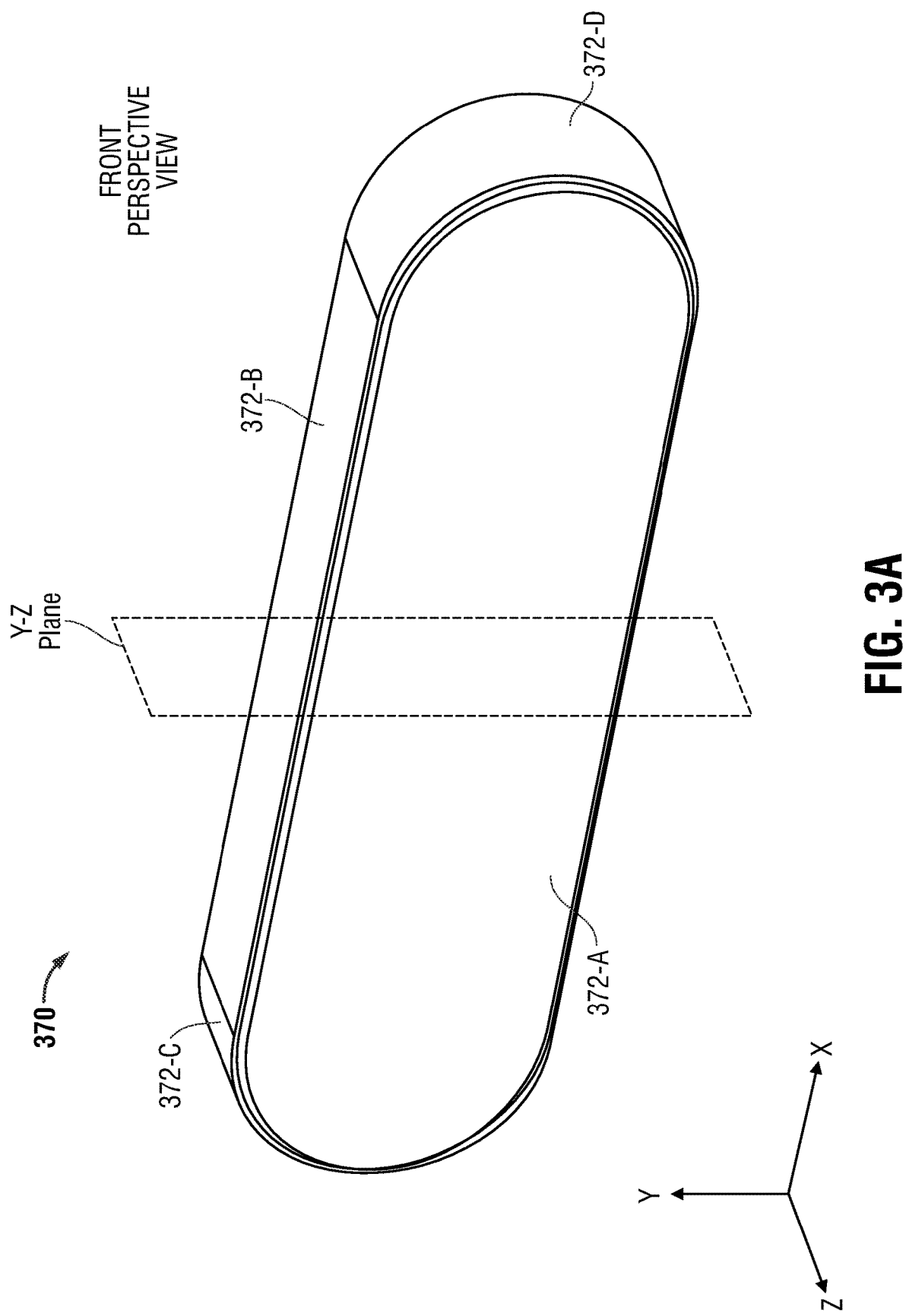
FIG. 3A is a graphical illustration of a perspective view of the front of a wireless gaming keyboard or mouse adapter according to an embodiment of the present disclosure.

FIG. 3A is a graphical illustration of a front perspective view of a wireless gaming keyboard and mouse adapter 370 according to an embodiment of the present disclosure. As described herein, the wireless gaming keyboard and mouse adapter system may enable transmission of input/output gaming instructions to a cloud-based gaming server, without communications through an intermediate information handling system, via an antenna embedded within a liquid crystal polymer (LCP) face plate 372-A of a small form-factor adapter 370 mated directly to a gaming keyboard or gaming mouse or incorporated within a gaming keyboard or gaming mouse. Because the wireless gaming keyboard and mouse adapter 370 may mate directly with a gaming keyboard or gaming mouse, or be incorporated within the exterior housing of a gaming keyboard or gaming mouse, there exists a need to limit the size of such a wireless gaming keyboard and mouse adapter 370. Thus, the wireless gaming keyboard and mouse adapter 370 face plate 372-A may also incorporate one or more electrical circuits, as described in greater detail herein with respect to FIGS. 4A, 4B, and 4C.

The face plate 372-A may be comprised of injection molded Liquid Crystal Polymers (LCPs) in an embodiment. The wireless gaming keyboard and mouse adapter 370 may include LCP sidewalls that may be shown in the orientation of FIG. 3A as an LCP ceiling 372-B, a left LCP side wall 372-C, a right LCP side wall 372-D, an LCP floor, and an inner layer of the LCP face plate 372-A in an embodiment that may be injection molded as a single piece of LCP material. As described in greater detail with respect to FIGS. 4A, 4B, and 4C, one or more additional layers of LCP material may be bonded to, injection molded atop, or adhered atop an inner layer of LCP face plate 372-A, as described herein further below. The LCP material comprising the housing in embodiments may provide high insulation, high fluidity during molding, high heat, chemical, oil, and gas tolerance, dimensional stability, flatness, and high stiffness in comparison with existing materials used in integrated circuits. Also of great importance, the LCP material may withstand reflow soldering and laser etching without distorting, melting, or blistering. This may allow for more precise etching and injection of liquid metals such as copper within the etched LCP material than can be achieved with more traditional integrated circuit materials.

Figure 3B:
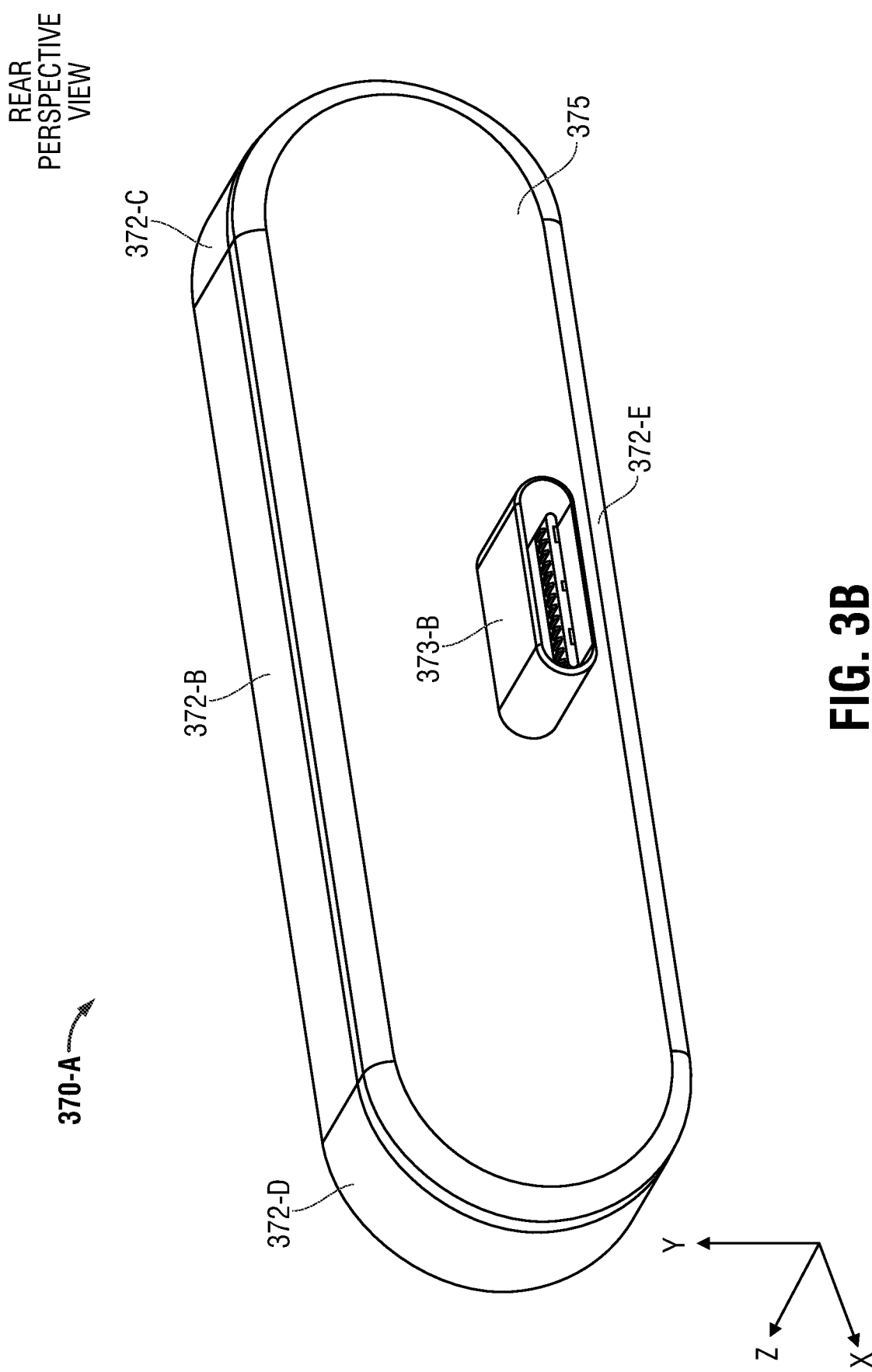
FIG. 3B is a graphical illustration of a perspective view of the rear of a wireless gaming keyboard or mouse adapter according to an embodiment of the present disclosure.

FIG. 3B is a graphical illustration of a rear perspective view of a wireless gaming keyboard or gaming mouse adapter 370-A according to an embodiment of the present disclosure. As described herein, the wireless gaming keyboard and mouse adapter may be combined with a back plate to form a peripheral adapter (e.g., dongle) for mating to a gaming keyboard or gaming mouse or other peripheral input/output device (e.g., virtual reality headset, joystick, hand-held controller, etc.), or may be incorporated within the exterior surface of a gaming keyboard or gaming mouse to form a wireless gaming keyboard or a wireless gaming mouse. In an embodiment described with reference to FIG. 3B in which the wireless gaming keyboard and mouse adapter is designed to form a peripheral adapter or dongle 370-A for mating to a gaming keyboard or gaming mouse or other peripheral input/output device, a back plate 375 for enclosing multiple electronic devices within the adapter may be fabricated. In some embodiments, this back plate 375 may comprise LCP material. In other embodiments, other materials such as plastics, metals, or composites may also be used. An opening within the back plate 375 may be formed (e.g., by machining, etching, or injection molding within the back plate design) for partial insertion of a USB-C adapter 373-B. Such a USB-C adapter 373-B in an embodiment may mate with a USB-C adapter mounting enclosed within the adapter housing, as described in greater detail with respect to FIGS. 3C and 3D. The wireless gaming keyboard and mouse adapter 370-A may include LCP sidewalls shown in the orientation of FIG. 3B as an LCP ceiling 372-B, left LCP wall 372-C, right LCP wall 372-D, and LCP floor 372-E may be bonded, adhered, or otherwise mechanically coupled to the back plate 375 to form the gaming keyboard or gaming mouse adapter 370-A.

Figure 3C:
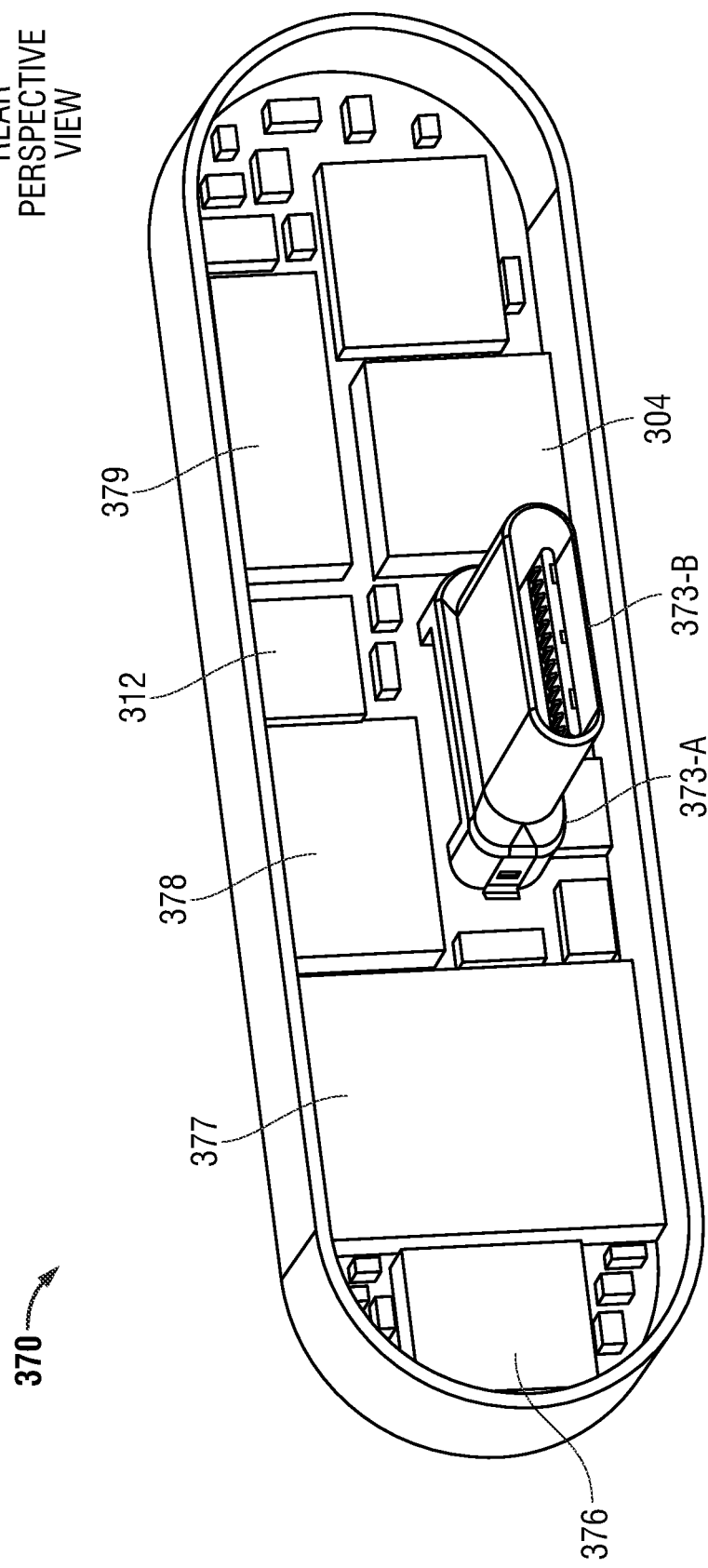
FIG. 3C is a graphical illustration of a cut-away perspective view of the rear of a wireless gaming keyboard or mouse adapter according to an embodiment of the present disclosure.

FIG. 3C is a graphical illustration of a cut-away rear perspective view of a wireless gaming keyboard and mouse adapter 370 that may be a peripheral adapter or dongle or may be integrated into a gaming keyboard or gaming mouse according to embodiments of the present disclosure. As described herein, the wireless gaming keyboard and mouse adapter 370 may receive input/output gaming instructions from a peripheral input/output device (e.g., keyboard, mouse, virtual headset, etc.) and transmit those input/output gaming instructions to via a wireless network AP to a remote cloud-based gaming server. For example, the wireless gaming keyboard and mouse adapter 370 may be coupled to such a peripheral input/output device through coupling of a USB-C adapter 373-B with a USB-C port of the peripheral input/output device when in a peripheral adapter or dongle form as shown. The USB-C adapter 373-B in such an embodiment may be mated to or otherwise communicatively coupled to a USB-C adapter mounting 373-A incorporated within the wireless gaming keyboard and mouse adapter 370 and housed entirely therewithin. The USB-C adapter mounting 373-A in an embodiment may receive player input/output gaming instructions in the form of keystrokes, mouse movement, or mouse clicks via a USB-C connection with the keyboard or mouse controllers, or controllers of other peripherally attached input/output devices. Other embodiments contemplate the use of other types of external data buses (e.g., non-USB) and external data bus adapters, such as Serial Advanced Technology Attachment (SATA), firewire, or IEEE 1284 buses.

The wireless gaming keyboard and mouse adapter 370 may further house a controller 379 in an embodiment that may execute code instructions of a wireless gaming keyboard and mouse adapter system to retrieve these player input/output gaming instructions via an electrical circuit embedded within the adapter front plate. The controller 379 may be in communication, via such an electrical circuit or several such circuits with other electronic components housed within the wireless gaming keyboard and mouse adapter 370 such as a network interface device, a Universal Serial Bus Hub 312, memories 304, transistors (e.g., MOSFETs), among others. As described with reference to FIG. 1 above, the network interface device in an embodiment may comprise one or more sub-components, including an antenna front end 378, radio modem controller 377, or antenna systems 376 such as an RF integrated circuit and antenna. The antenna systems 376 may operate to wirelessly transmit input/output gaming instructions generated at controller 379 to a remote gaming application server in a network. Each of these network interface device sub-components (e.g., 376, 377, and 378) may be electrically coupled to the controller 379, or to one another via one or more electrical circuits embedded within the adapter front plate.

The controller 379 in an embodiment may instruct the network interface device or its various sub-components (e.g., 376, 377, or 378) to transmit the input/output gaming instructions to a cloud-based gaming server via a wireless network AP. This may occur in embodiments in which the controller 379 is incorporated within a dongle (e.g., as described with reference to FIG. 3B above), or in embodiments in which the controller 379 is incorporated within an adapter that is further incorporated into the exterior surface of either a gaming keyboard or a gaming mouse. For example, the controller 379 in an embodiment may instruct the antenna front end 378 to engage the radio modem controller 377 and antenna systems 376 to transmit the input/output gaming instructions via an antenna embedded within the adapter front plate. As described herein, coding instructions of the wireless gaming keyboard and mouse adapter system may execute retrieval of an IP address of a cloud-based gaming application server generating a gaming environment for display on a remote operating system executing an agent or sub-portion of the gaming application hosted at the cloud-based server. The wireless gaming keyboard and mouse adapter system in an embodiment may receive the IP address for the cloud-based gaming application server via a wireless or wired alternative connection to an input/output device in communication with the player's client information handling system (e.g., 100 described with reference to FIG. 1) executing the agent of the gaming software application, for example. In another embodiment, the IP address of the cloud-based gaming application server may be received via the wireless connection of the dongle or integrated wireless gaming keyboard and mouse adapter system. The antenna front end 378 may package data frames for transmission via this antenna to a cloud-based gaming server. In such a way, the wireless gaming keyboard and mouse adapter system may enable transmission of input/output gaming instructions to a cloud-based gaming server, without communications through an intermediate information handling system, via an antenna embedded within an LCP face plate of a small form-factor adapter 370 mated directly to a gaming keyboard or gaming mouse or incorporated within a gaming keyboard or a gaming mouse.

Figure 3D:
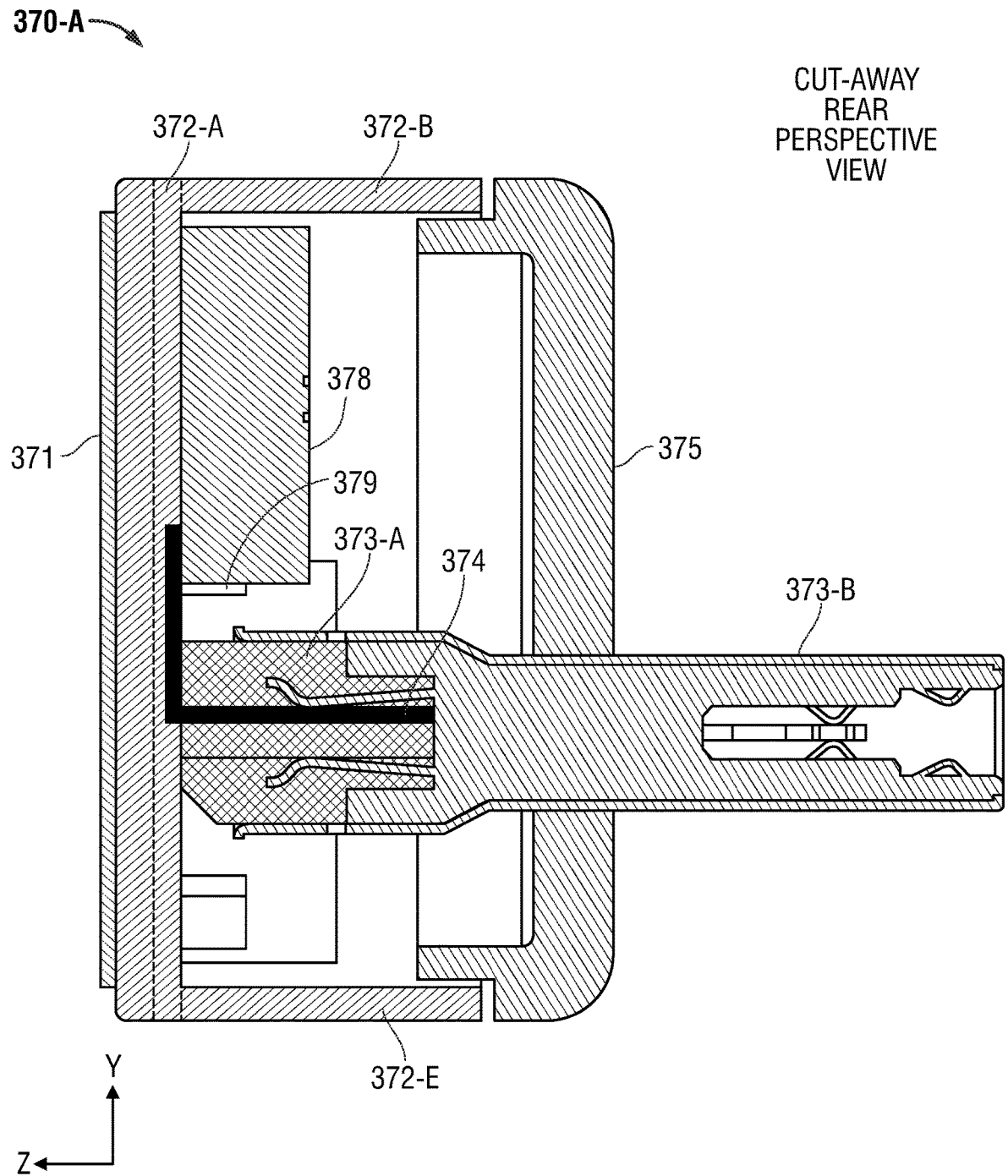
FIG. 3D is a graphical illustration of a cross-sectional view of a wireless gaming keyboard or gaming mouse adapter according to an embodiment of the present disclosure.

FIG. 3D is a graphical illustration of a cross-sectional view of a wireless gaming keyboard or gaming mouse adapter 370-A in the Y-Z plane according to an embodiment of the present disclosure. A USB-C adapter mounting 373-A may be housed within an adapter housing formed by an injection molded LCP front plate inner layer 372-A, an LCP ceiling 372-C, an LCP left side wall, an LCP right side wall, an LCP floor 372-E, and a back plate 375, as shown in FIG. 3D. A USB-C adapter 373-B may be inserted within an opening of the back plate 375 and mated to or otherwise communicatively coupled to the USB-C adapter mounting 373-A. The USB-C adapter 373-B may also insert into a port of a peripheral input/output device (e.g., keyboard, mouse, virtual reality headset, joystick, hand-held controller, etc.) to form a USB-C connection between the adapter 370-A and such a peripheral input/output device. The USB-C adapter mounting 373-A in an embodiment may receive player input/output gaming instructions in the form of keystrokes, mouse movement, or mouse clicks via a USB-C connection with the keyboard or mouse controllers, or controllers of other peripherally attached input/output devices.

The USB-C adapter mounting 373-A may be electrically coupled to a controller 379 and an antenna front end 378 via an electrical circuit 374 embedded within an LCP face plate inner layer 372-A. In some embodiments, the USB-C adapter mounting 373-A may be coupled to the controller 379 and to the antenna front end 378 by separate electrical circuits embedded within the LCP face plate inner layer 372-A. The electrical circuit 374 may extend into or be electronically coupled with an electrical connector (e.g., one or more pins) housed within the USB-C adapter mounting 373-A. Such electrical connectors or pins may come into electrically conductive contact with one or more connectors or pins within the USB-C adapter 373-B upon mating of the USB-C adapter 373-B to the USB-C adapter mounting 373-A. The USB-C adapter 373-B may then be inserted through the back plate 375 and the back plate 375 may be mechanically coupled, bonded, or adhered to the LCP ceiling 372-B, LCP floor 372-E, LCP left side wall, and LCP right side wall to fully enclose the USB-C adapter mounting 373-A, antenna front end 378 and controller 379 in an embodiment that is a peripheral adapter or dongle. As described herein, some embodiments may further incorporate an electro-magnetically transparent top layer 371 adhered to the outer LCP layers for durability or appearance. Others may incorporate the wireless gaming keyboard and mouse adapter system into a keyboard or mouse and a USB or other external bus connection via circuit 374 between the controller 379 in the wireless gaming keyboard and mouse adapter system and a I/O device controller such as a gaming keyboard controller or a gaming mouse controller.

Figure 4A:
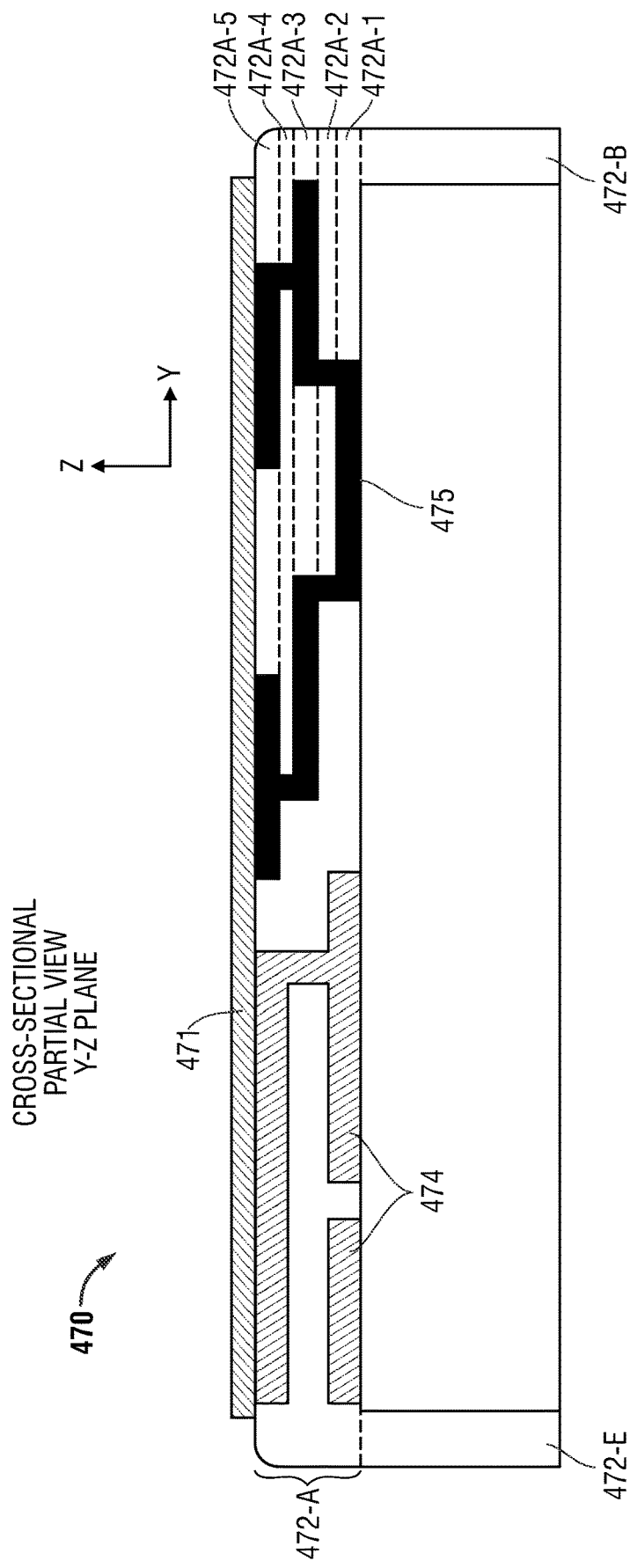
FIG. 4A is a graphical illustration of a partial cross-sectional view of a wireless gaming keyboard and mouse adapter according to an embodiment of the present disclosure.

FIG. 4A is a graphical illustration of a cross-sectional view of a wireless gaming keyboard and mouse adapter 470 in the Y-Z plane according to an embodiment of the present disclosure. As described herein, because the wireless gaming keyboard and mouse adapter 470 described herein may operatively couple as a dongle with a gaming keyboard or gaming mouse or other peripheral device, or may be incorporated within the exterior housing of a gaming keyboard or gaming mouse or other peripheral device, layering of the electrical circuit 474 or antenna electrical circuit 475 into a plurality of vertical stacked portions (e.g., stacked vertically atop the electrical components housed within the housing), may be desirable. Such layered electrical circuits or antenna electrical circuits may be embedded within an injection molded liquid crystal polymer (LCP) face plate 472-A of the wireless gaming keyboard and mouse adapter 470 in an embodiment.

The LCP face plate 472-A may comprise a plurality of layers, within each of which one of the vertically stacked portions of the electrical circuit 474 or the antenna circuit 475 may be embedded. For example, the LCP face plate 472-A may comprise an inner LCP layer 472A-1 adjoining the LCP ceiling 472-B and the LCP floor 472-E. This inner (e.g., situated in the negative Z direction) LCP layer 472A-1 may be situated closest to the interior of the wireless gaming keyboard and mouse adapter housing within which various electrical components of the wireless gaming keyboard and mouse adapter may be situated. An intermediate LCP layer 472A-2 may be situated across the surface of the inner LCP layer 472A-1 opposite the LCP ceiling 472-B and LCP floor 472-E. An outer (e.g., situated in the positive Z direction) LCP layer 472A-3 may be situated across the surface of the intermediate LCP layer 472A-2 opposite the inner LCP layer 472A-1. In some embodiments, further outer layers (e.g., 472A-4 or 472A-5) may be disposed on the outer surface of the outer LCP layer 472A-3.

The LCP face plate 472-A in an embodiment may thus comprise an inner LCP layer 472A-1 situated closest to the electrical components housed within the housing, an intermediate LCP layer 472A-2, and an outer LCP layer 472A-3 forming the exterior surface of the face plate. Other embodiments may include multiple outer layers, multiple intermediate layers, or an electro-magnetically transparent top layer 471 adhered to the outer LCP layers for durability or appearance. One or more antennas embedded within the LCP face plate 472-A are contemplated in various embodiments herein. For example, various embodiments contemplate at least the inclusion of a primary antenna and a secondary or diversity antenna, with one of the two antennas operating to transmit signals and the other of the two antennas operating to receive signals. In other embodiments, the primary antenna may transmit and receive signals within a first frequency range and the secondary antenna may transmit and receive signals within a second frequency range that does not overlap the first. Combinations of various numbers of such antennas are also contemplated in various embodiments. For example, various embodiments may incorporate 4×4 or 8×8 patch antenna arrays to enable multiple input multiple output (MIMO) and uplink MIMO communications.

FIG. 4B is a graphical illustration of a cross-sectional partial view of an antenna embedded within an LCP face plate 472-A for a wireless gaming keyboard and mouse adapter 470 in the Y-Z plane according to an embodiment of the present disclosure. As described herein, size constraints may warrant layering of the electrical circuit or antenna electrical circuit into a plurality of vertical stacked portions. Thus, an antenna fabrication method may involve etching of the inner LCP layer 472A-1 to form an antenna electrical circuit pattern into which an electrically conductive material may be placed to form an antenna electrical circuit 475A. The antenna electrical circuit may operably connect the antenna to the antenna front end device described above with respect to FIG. 3C. Such a fabrication method may further involve disposition of the intermediate LCP layer 472A-2 across the outer surface of the inner LCP layer 472A-1. An antenna via may then be etched or drilled through the intermediate LCP layer 472A-2 such that the antenna via contacts the electrically conductive material of the antenna electrical circuit 475A. The electrically conductive material may be disposed within this antenna via to form an antenna lead 475-B. An outer LCP layer 472A-3 may be disposed across the outer surface of the intermediate LCP layer 472A-2. An antenna pattern may be etched into the outer LCP layer 472A-3 to contact the electrically conductive material of the antenna lead 475-B. The electrically conductive material may be disposed within the outer LCP layer 472A-3 to form an antenna 475-C capable of transmitting data at frequencies above 24 GHz, such as at 60 GHz in WiFi-6, embedded within the plurality of LCP layers (e.g., 472A-1, 472A-2, and 472A-3) of the LCP face plate.

The layers (e.g., 472A-1, 472A-2, or 472A-3) of the LCP face plate may be disposed atop the LCP face plate floor and ceiling and atop one another using an injection molding technique in an embodiment. Patterns and vias may be formed in the various layers (e.g., 472A-1, 472A-2, or 472A-3) of the LCP face plate using a variety of techniques according to various embodiments of the present disclosure. For example, patterns or vias may be drilled into the various layers (e.g., 472A-1, 472A-2, or 472A-3) of the LCP face plate in some embodiments. In other embodiments, the patterns or vias may be etched into the various layers (e.g., 472A-1, 472A-2, or 472A-3) of the LCP face plate using laser ablation. In still other embodiments, a masking and acid deposition technique may be used to etch the patterns or vias into the various layers (e.g., 472A-1, 472A-2, or 472A-3) of the LCP face plate. Still other embodiments contemplate the use of any method now known or developed in the future for etching, drilling, or otherwise removing material from portions of the various layers (e.g., 472A-1, 472A-2, or 472A-3) of the LCP face plate to form such patterns or vias.

FIG. 4C is a graphical illustration of a cross-sectional view of an electrical circuit pattern etched into an LCP face plate for a wireless gaming keyboard and mouse adapter 470 in the Y-Z plane according to an embodiment of the present disclosure. A circuit fabrication method may involve etching of the inner LCP layer 472A-1 to form an inner circuit pattern into which an electrically conductive material may be placed to form an inner circuit portion 474A. Such a fabrication method may further involve disposition of the intermediate LCP layer 472A-2 across the outer surface of the inner LCP layer 472A-1. A via may then be etched or drilled through the intermediate LCP layer 472A-2 such that the via contacts the electrically conductive material of the inner circuit portion 474A. The electrically conductive material may be disposed within this via to form an intermediate circuit portion 474-B. An outer LCP layer 472A-3 may be disposed across the outer surface of the intermediate LCP layer 472A-2. An outer circuit pattern may be etched into the outer LCP layer 472A-3 to contact the electrically conductive material of the intermediate circuit portion 474-

B. The electrically conductive material may be disposed within the outer LCP layer 472A-3 to form an outer circuit portion 474-C. Because the electrically conductive material of the intermediate circuit portion 474-B contacts the electrically conductive material of the inner circuit portion 474A and the outer circuit portion 474C, the inner circuit portion 474A, intermediate circuit portion 474B, and outer circuit portion 474C together may comprise a single circuit which may be electrically or operatively coupled to various hardware components housed within the interior of the wireless gaming keyboard or mouse adapter housing.

Figure 5A:
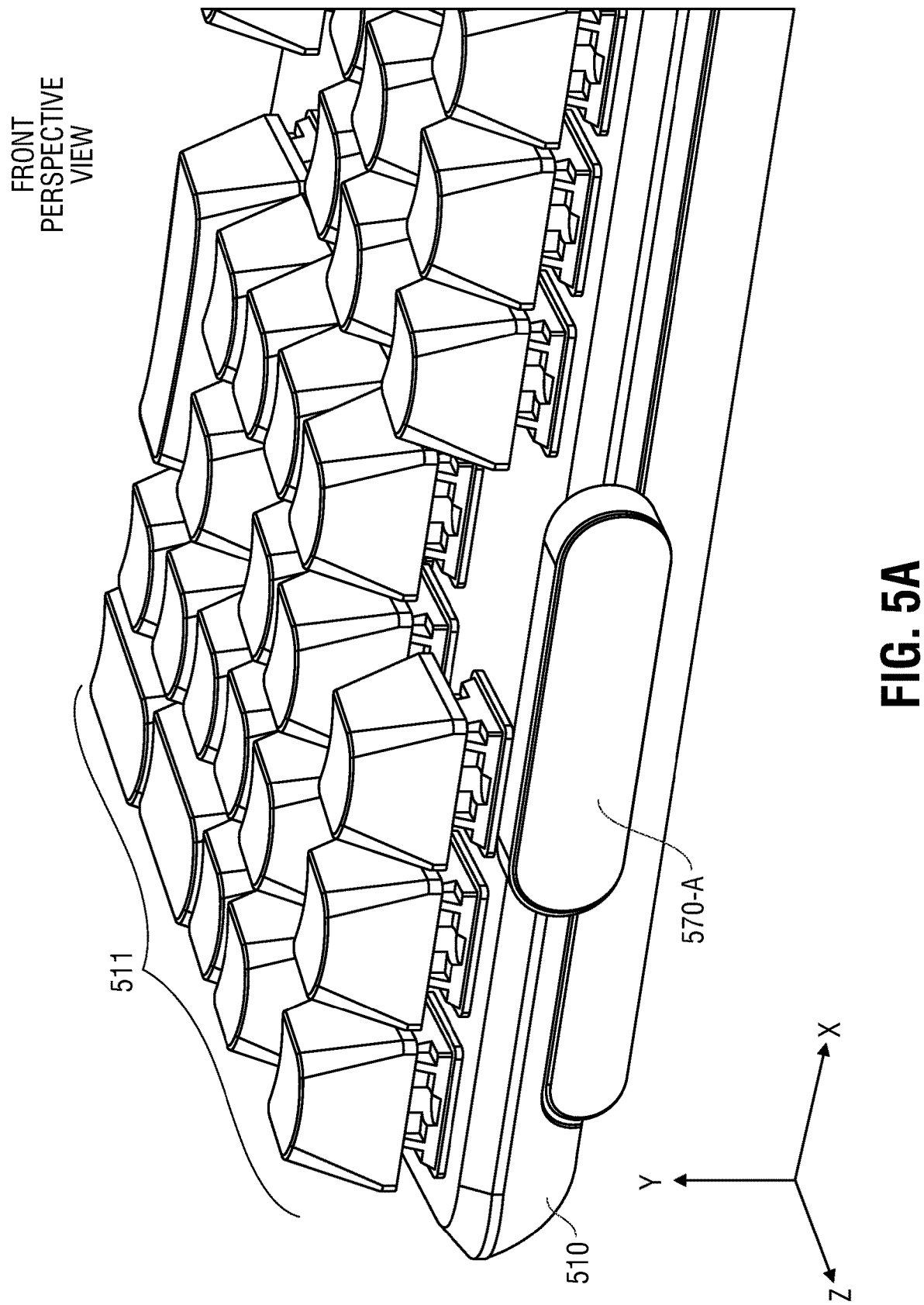
FIG. 5A is a graphical illustration of a perspective view of a wireless gaming keyboard or mouse adapter mated with a gaming keyboard according to an embodiment of the present disclosure.

FIG. 5A is a graphical illustration of a front perspective view of a wireless gaming keyboard and mouse adapter 570-A in a dongle form operatively coupled with a gaming keyboard 510 according to an embodiment of the present disclosure. As described herein, the USB-C adapter mounting may receive player input/output gaming instructions in the form of keystrokes or movement of one or more keys 511 of the keyboard 510 via a USB-C connection with the keyboard 510.

Figure 5B:
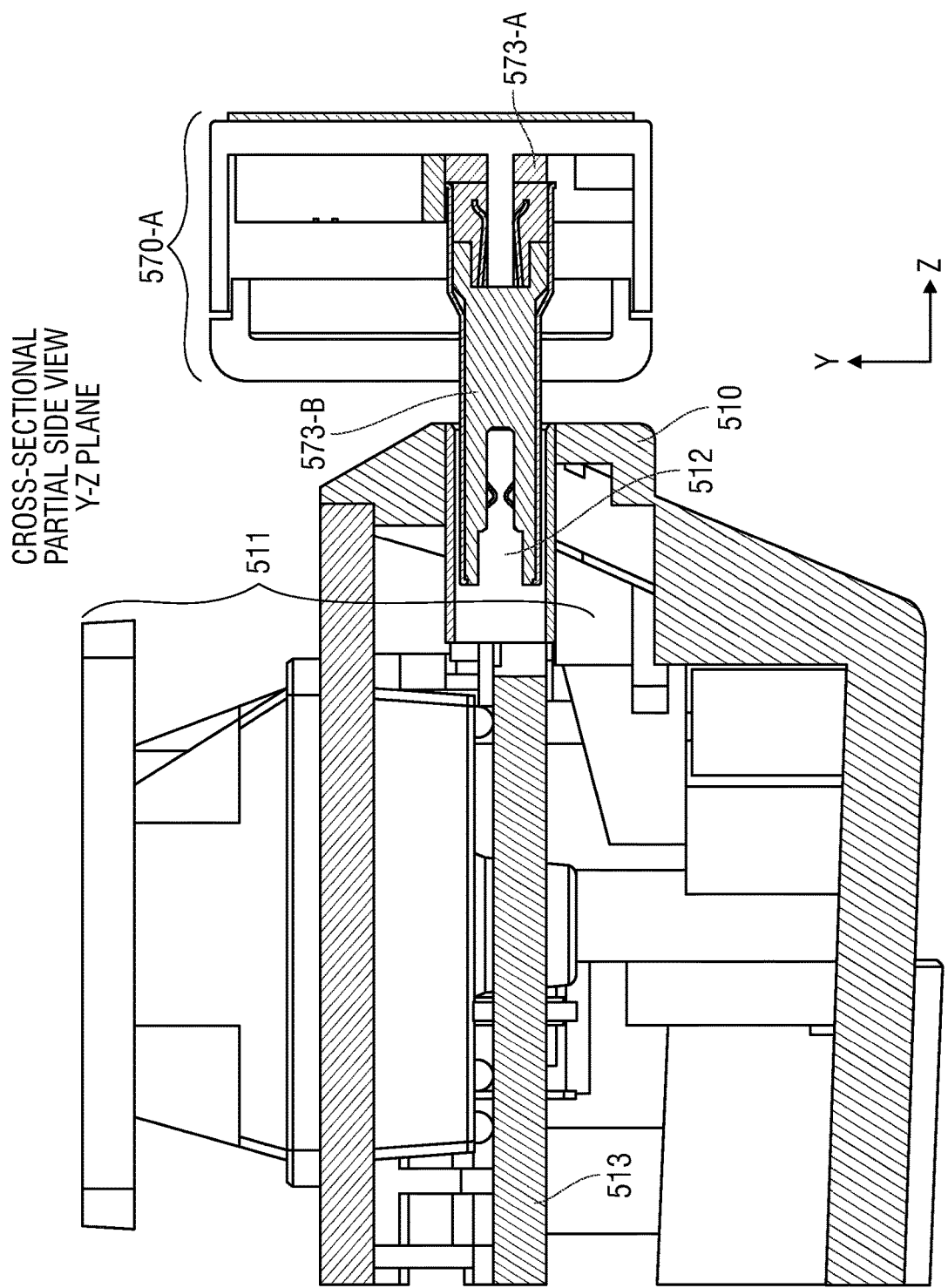
FIG. 5B is a graphical illustration of a cross-sectional side view of a wireless gaming keyboard or mouse adapter mated with a gaming keyboard according to an embodiment of the present disclosure.

FIG. 5B is a graphical illustration of a cross-sectional side view of a wireless gaming keyboard and mouse adapter 570-A in a dongle form operatively coupled with a gaming keyboard 510 according to an embodiment of the present disclosure. As described herein, the wireless gaming keyboard and mouse adapter 570-A may house a USB-C adapter mounting 573-A coupled to a USB-C adapter 573-B. The USB-C adapter 573-B may operatively couple to a USB-C adapter 512 of the keyboard 510 to form a USB-C connection between the wireless gaming keyboard and mouse adapter 570-A and an input/output controller line 513 operably connected to a controller of the keyboard 510. The input/output controller operably connected to the USB-C adapter 512 via controller line 513 in an embodiment may register keystrokes or movement of the keys 511 of the keyboard 510. The USB-C adapter mounting 573-A may receive player input/output gaming instructions in the form of indications of such keystrokes received from the input/output controller operably connected to the USB-C adapter 512 via controller line 513 via this USB-C connection. Such a dongle wireless gaming keyboard and mouse adapter 570-A may also operatively couple to a gaming mouse or other input/output peripheral device.

Figure 6A:
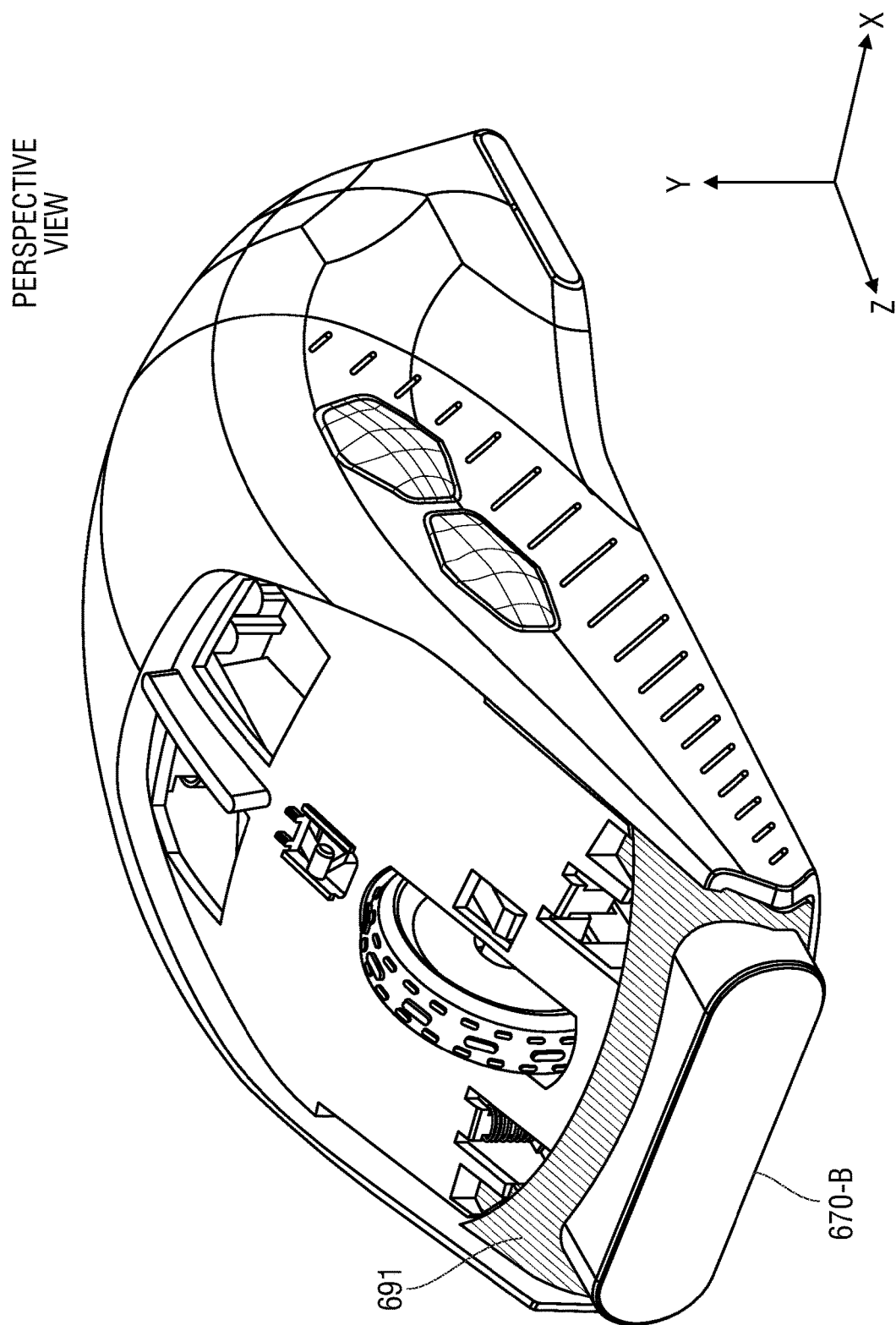
FIG. 6A is a graphical illustration of a perspective view of a gaming mouse incorporating a wireless gaming keyboard or mouse adapter according to an embodiment of the present disclosure.

FIG. 6A is a graphical illustration of a front perspective view of a gaming mouse incorporating a wireless gaming adapter 670-B according to an embodiment of the present disclosure. As described herein, the USB-C adapter mounting may receive player input/output gaming instructions in the form of movement or clicks from a gaming mouse via a USB-C connection with the mouse. The exterior surface of the wireless gaming adapter 670-B housing in such an embodiment may be inserted into, incorporated within (partially or wholly), bonded to, adhered to, or otherwise operatively coupled to the exterior surface 691 of such a gaming mouse. In other embodiments, the wireless gaming adapter 670-B may similarly be inserted into, incorporated within, bonded to, adhered to, or otherwise operatively coupled to the exterior surface of a gaming keyboard or other gaming peripheral device.

Figure 6B:
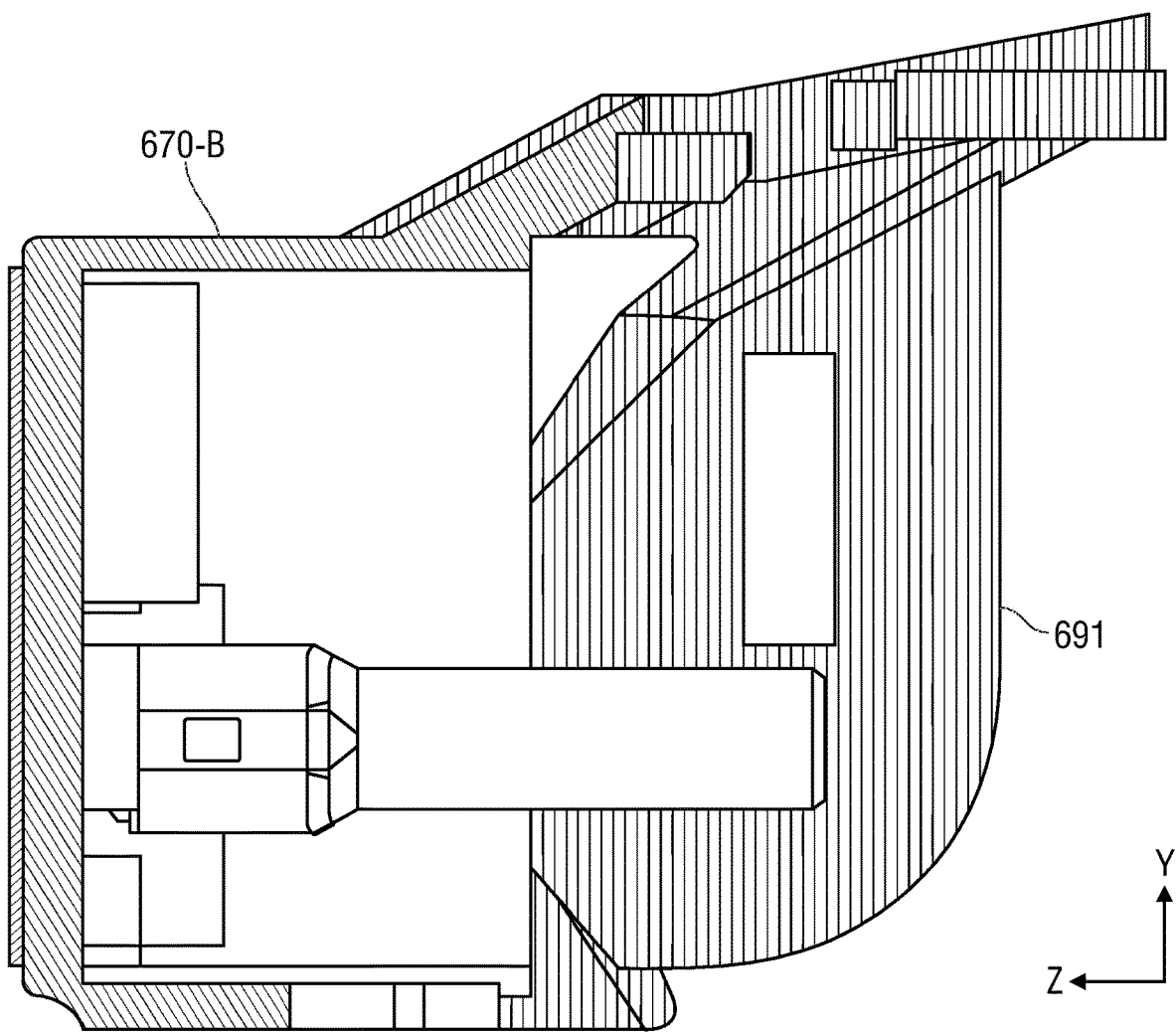
FIG. 6B is a graphical illustration of a cross-sectional side view of a wireless gaming keyboard or mouse adapter according to an embodiment of the present disclosure.

FIG. 6B is a graphical illustration of a cross-sectional side view of a wireless gaming keyboard and mouse adapter 670-B according to an embodiment of the present disclosure. The exterior surfaces of the wireless gaming keyboard and mouse adapter 670-B may be incorporated into, inserted into, bonded to, adhered to, or otherwise mechanically coupled to the exterior surface 691 of a gaming mouse in an embodiment. Because the adapter 670-B is incorporated within the mouse exterior surface 691 in such a way, the adapter 670-B may be intended for permanent or non-removable placement of the adapter 670-B within the body of the gaming mouse. In such an embodiment, the adapter 670-B may lack a back plate as described above (e.g., FIGS. 5A and 5B) with respect to the dongle version of the adapter. In other embodiments, the wireless gaming adapter 670-B may similarly be inserted into, incorporated within, bonded to, adhered to, or otherwise operatively coupled to the exterior surface of a gaming keyboard or other gaming peripheral device.

Figure 6C:
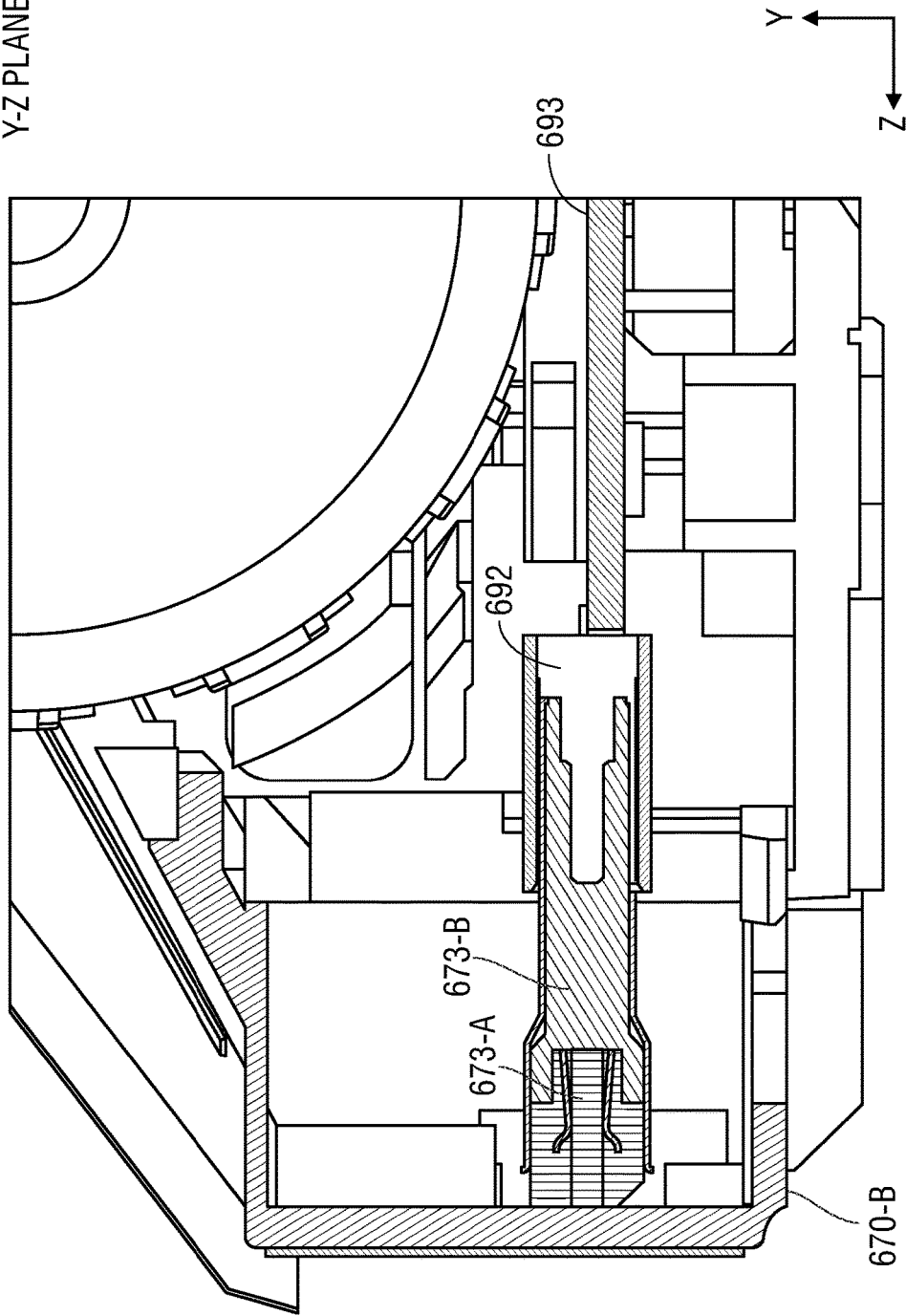
FIG. 6C is a graphical illustration of a cross-sectional side view of a wireless gaming keyboard or mouse adapter incorporated within a gaming mouse according to an embodiment of the present disclosure.

FIG. 6C is a graphical illustration of a cross-sectional side view of a wireless gaming keyboard and mouse adapter 670-B incorporated within the exterior surface 691 of a gaming mouse according to an embodiment of the present disclosure. As described herein, the wireless gaming keyboard and mouse adapter 670-B may house a USB-C adapter mounting 673-A coupled to a USB-C adapter 673-B. The USB-C adapter 673-B may operatively couple to a reciprocal USB-C adapter 692 of the mouse to form a USB-C connection between the wireless gaming keyboard and mouse adapter 670-B and an input/output controller 693 of the mouse. The input/output controller 693 in an embodiment may register movement or clicks of the mouse. The USB-C adapter mounting 673-A may receive player input/output gaming instructions in the form of indications of such movement, clicks, or rotation of a scroll wheel of the mouse from the input/output controller 693 via this USB-C connection.

Figure 7:
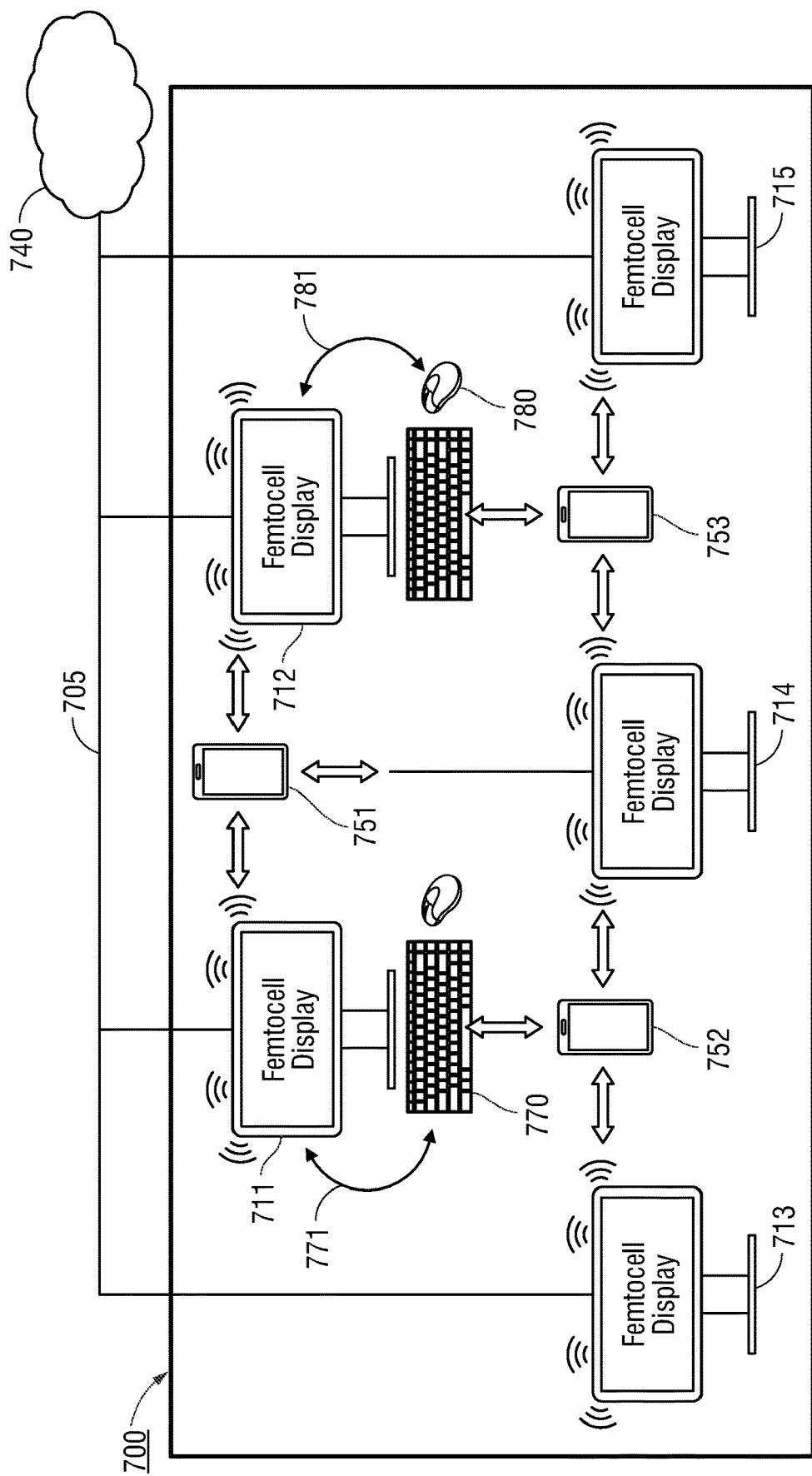
FIG. 7 is a block diagram illustrating a wireless gaming keyboard or mouse adapter communicating within a wireless network according to an embodiment of the present disclosure.

FIG. 7 is a block diagram illustrating a wireless gaming keyboard or mouse adapter communicating input/output gaming instructions to a cloud-based server 740 within a wireless network 705 according to an embodiment of the present disclosure. As described herein, the wireless gaming keyboard and mouse adapter system in an embodiment may couple a wireless adapter to a gaming keyboard 770 or a gaming mouse 780 to bypass communication of input/output gaming instructions to a players' information handling system and communicate such input/output gaming instructions received via the gaming keyboard 770 or gaming mouse 780 more directly to a cloud-based server 740 through a wireless network 705. With the shift of computing resources to the cloud, many computer gaming software applications have evolved to execute a large portion of the gaming software application at a cloud-based server (e.g., 740) located remotely from each of the players' information handling systems. In such systems, each of the players' information handling systems may be tasked primarily with the display of a gaming environment, while generation of the gaming environment is delegated to the cloud-based server 740.

Quality of players' gaming experiences depend heavily on the ability of the gaming software application executing at each of the players' information handling systems to reflect the players' input/output gaming instructions in real time, or as close to real time as possible. In such a cloud-based gaming environment, when a player's information handling system receives that player's input/output gaming instructions from a peripherally attached input/output device (e.g., 770 or 780), the player's information handling system must then transmit the received input/output gaming instructions to the cloud-based server 740 for processing. In other words, the player's information handling system in such a cloud-based architecture may serve as an intermediate and ultimately unnecessary stop between the peripherally attached input/output device and the cloud-based server. Such an unnecessary intermediate stop may further increase lag between the player's input of such input/output gaming instructions via the peripherally attached input/output device and processing of those input/output gaming instructions at the cloud-based server. As described above, this type of lag may impact player experience.

The wireless gaming keyboard and mouse adapter system in embodiments described herein may omit this unnecessary stop at the information handling system by allowing a peripheral gaming input/output device (e.g., a gaming keyboard 770 or a gaming mouse 780) to transmit input/output gaming instructions to the cloud-based server 740 via the wireless network 705. In such an embodiment, the gaming keyboard 770 or gaming mouse 780 may be located in relatively close proximity to an access point (AP) for the wireless network 705. For example, such a wireless network AP may be incorporated within a digital display device (e.g., 711 or 712) for a 5G link in an embodiment. The display device 711 or 712 may operate to display the gaming environment generated at the cloud-based server 740 to a player. In such an embodiment, the digital display device (e.g., 711 or 712) may act as a wireless network AP for a 5G wireless link 771 or 781 for a gaming mouse 780 or a gaming keyboard 770. In another aspect of an embodiment, several of these displays (e.g., 711, 712, 713, 714, or 715) may be located within a single building 700 or room of a building 700. Each of these digital displays (e.g., 711, 712, 713, 714, or 715) may be connected via a wired connection to a backhaul and act as a 5G base station or small-cell base station, for example. Thus, each of the digital displays (e.g., 711, 712, 713, 714, or 715) may support a limited radius 5G wireless network access point, since frequencies above 24 GHz best support communications over shorter distances, such as within a few meters. These digital displays may also provide access to the wireless network 705 to one or more handheld communication devices, such as mobile phones (e.g., 751, 752, or 753).

The gaming keyboard 770 coupled with or incorporating a wireless gaming keyboard or mouse adapter (e.g., as described above with respect to FIGS. 5A and 5B) may establish a wireless link 771 via the network interface device of the wireless gaming keyboard or mouse adapter with the wireless network AP at digital display device 711, for example. Input/output gaming instructions input into the gaming keyboard 770 may then be transmitted to the wireless gaming keyboard or mouse adapter via a USB-C connection, and then transmitted from the wireless gaming keyboard or mouse adapter to the wireless network AP at display device 711. In another example, the gaming mouse 780 may be coupled with or incorporate a wireless gaming keyboard or mouse adapter (e.g., as described above with respect to FIGS. 6A, 6B, and 6C), which may establish a wireless link 781 via the network interface device of the wireless gaming keyboard or mouse adapter, with the wireless network AP at display device 712. Input/output gaming instructions input into the gaming mouse 780 may then be transmitted to the wireless gaming keyboard or mouse adapter via a USB-C connection, and then transmitted from the wireless gaming keyboard or mouse adapter to the wireless network AP at display device 712. Digital displays 711 and 712, acting as wireless network APs in such an embodiment may transmit such input/output gaming instructions to the cloud-based gaming server 740 via hardline connections to network 705. This may omit communication of such input/output gaming instructions to the players' information handling systems, displaying the gaming environment first and then the information handling system having to transmit input/output gaming instructions on to a 5G AP, and thus avoid any lag associated with such an unnecessary hop.

Further, use of the wireless network, and more specifically, the higher frequency bands available according to the New Radio (NR) Frequency Range 2 (FR2) standard, may further decrease lag by transmitting the input/output gaming instructions at frequencies (e.g., 5G mmWave frequencies within 24-100 GHz) unused by other nearby electrical components such as the players' information handling system or Wi-Fi networks. Wireless links (e.g., 771 and 781) transceiving at these higher frequencies may experience higher quality of service, less latency, higher throughput, and fewer dropped packets, for example, than wireless links established according to existing or earlier generation wireless communication standards such as Wi-Fi, 5G NR FR1 (e.g., for frequencies below 24 GHz), 4G, 3G, 2G, or 1G cellular communications.

In other embodiments, the network 705 may operate according to Wi-Fi standards such as Wi-Fi 6, IEEE 802.11 ad or IEEE 802.11 ay. In such an embodiment, the digital displays (e.g., 711 and 712) may operate as APs for the Wi-Fi network 705, and wireless links 771 and 781 may be established within frequency ranges supported by the applicable Wi-Fi standard (e.g., IEEE 802.11 ad or IEEE 802.11 ay).

Figure 8:
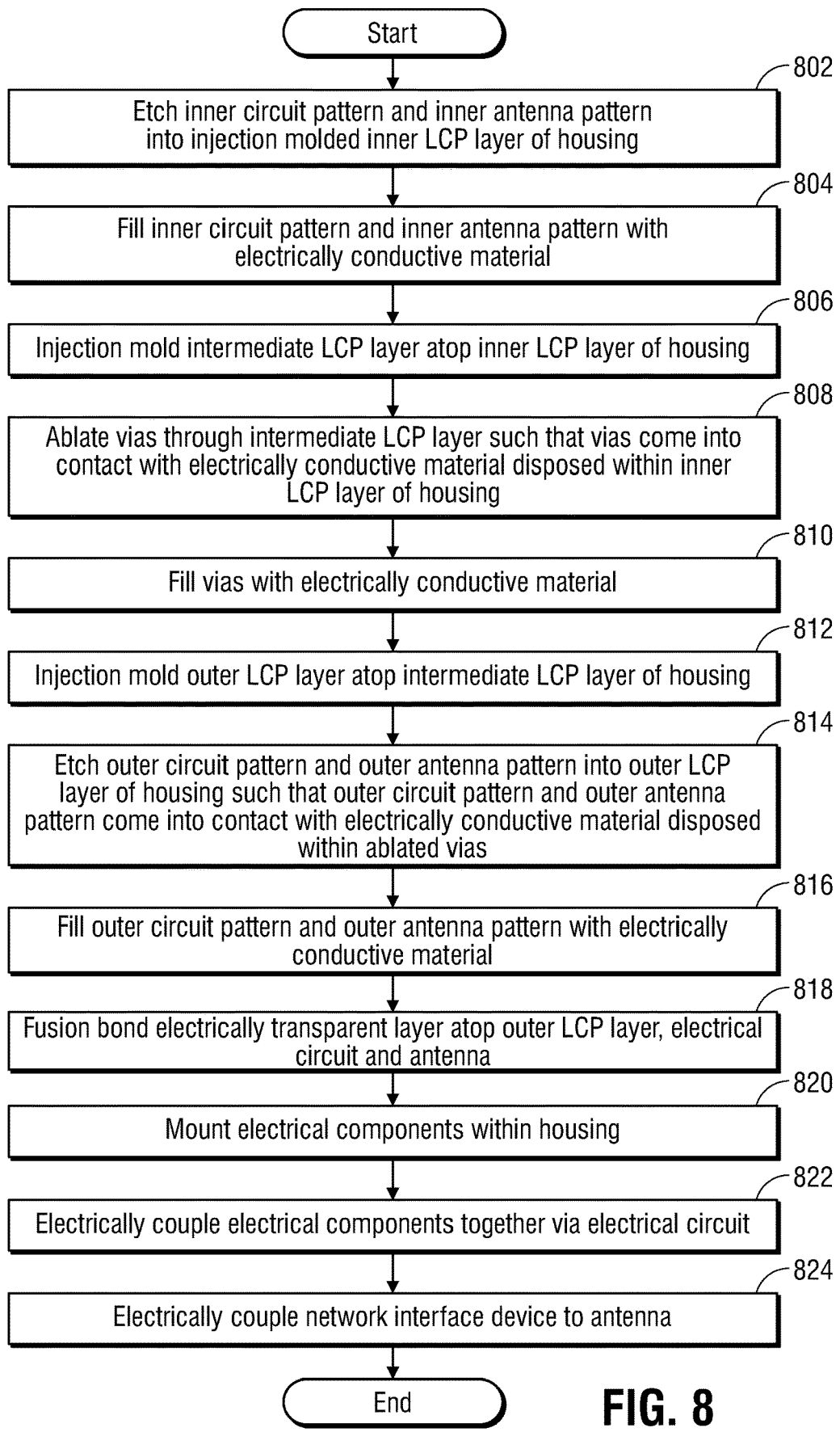
FIG. 8 is a flow diagram illustrating a method of fabricating a wireless gaming keyboard and mouse adapter housing with an embedded electrical circuit and antenna according to an embodiment of the present disclosure.

FIG. 8 is a flow diagram illustrating a method of fabricating a wireless gaming keyboard and mouse adapter with an electrical circuit and antenna embedded within an adapter housing according to an embodiment of the present disclosure. As described herein, existing methods for fabrication of integrated circuit and form-factor antennas may not be suitable for use in fabrication of wireless gaming keyboard and mouse adapters, because there exists a need to limit the size of such a wireless gaming keyboard and mouse adapter. Such size constraints may warrant layering of the electrical circuit or antenna into one or more of a plurality of vertical stacked portions (e.g., stacked vertically atop the electrical components housed within the housing), resulting in less consumption of exterior surface area, for example. Thus, the wireless gaming keyboard and mouse adapter in an embodiment may be fabricated to incorporate an electrical circuit and an antenna within the housing of the adapter itself using etched liquid crystal polymers (LCP).

At block 802, an inner circuit pattern and antenna electrical circuit pattern may be etched into an injection molded inner LCP layer of the wireless gaming keyboard and mouse adapter housing in an embodiment. For example, in an embodiment described with reference to FIG. 3D, sidewalls including the housing ceiling 372-B, housing floor 372-E, sidewalls, and inner layer of the housing face plate 372-A may be formed through injection molding. In another example embodiment described with reference to FIG. 4B, an antenna fabrication method may involve etching of the inner LCP layer 472A-1 to form an antenna electrical circuit pattern into which an electrically conductive material may be placed to form an antenna electrical circuit 475A. In another example embodiment described with reference to FIG. 4C, a circuit fabrication method may involve etching of the inner LCP layer 472A-1 to form an inner circuit pattern into which an electrically conductive material may be placed to form an inner circuit portion 474A.

At block 804, the inner circuit pattern and antenna electrical circuit pattern in an embodiment may be filled with electrically conductive material. For example, in an embodiment described with reference to FIG. 4B, an antenna fabrication method may involve etching of the inner LCP layer 472A-1 to form an antenna electrical circuit pattern into which an electrically conductive material may be placed to form an antenna electrical circuit 475A. In another example embodiment described with reference to FIG. 4C, a circuit fabrication method may involve etching of the inner LCP layer 472A-1 to form an inner circuit pattern into which an electrically conductive material may be placed to form an inner circuit portion 474A.

An intermediate LCP layer may be injection molded atop the inner LCP layer of the adapter housing in an embodiment at block 806. For example, in an embodiment described with reference to FIG. 4B, the intermediate LCP layer 472A-2 may be disposed across the outer surface of the inner LCP layer 472A-1. In another example embodiment described with reference to FIG. 4C, the intermediate LCP layer 472A-2 may be disposed across the outer surface of the inner LCP layer 472A-1.

At block 808, vias may be ablated through the intermediate LCP layer such that the vias come into contact with the electrically conductive materials of the inner antenna portion and antenna electrical circuit etched into the inner LCP layer of the adapter housing in an embodiment. For example, in an embodiment described with reference to FIG. 4B, an antenna via may be etched or drilled through the intermediate LCP layer 472A-2 such that the antenna via contacts the electrically conductive material of the antenna electrical circuit 475A. In another example embodiment described with reference to FIG. 4C, a via may be etched or drilled through the intermediate LCP layer 472A-2 such that the via contacts the electrically conductive material of the inner circuit portion 474A.

The vias may be filled with an electrically conductive material at block 810 in an embodiment. For example, in an embodiment described with reference to FIG. 4B, electrically conductive material may be disposed within the antenna via contacting the electrically conductive material of the antenna electrical circuit to form an antenna lead 475-B. In another example embodiment described with reference to FIG. 4C, electrically conductive material may be disposed within the via contacting the electrically conductive material of the inner circuit portion to form an intermediate circuit portion 474-B.

An outer LCP layer may be injection molded atop the intermediate LCP layer of the adapter housing in an embodiment at block 812. For example, in embodiments described with reference to FIG. 4B, an outer LCP layer 472A-3 may be disposed across the outer surface of the intermediate LCP layer 472A-2.

At block 814, an antenna pattern and an outer electrical circuit pattern may be etched into the outer LCP layer of the adapter housing such that each of the outer circuit pattern and antenna pattern openings come into contact with the electrically conductive material disposed within at least one of the ablated vias in an embodiment. For example, in an embodiment described with reference to FIG. 4B, an antenna pattern may be etched into the outer LCP layer 472A-3 to contact the electrically conductive material of the antenna lead 475-B. As another example, in an embodiment described with reference to FIG. 4C, an outer circuit pattern may be etched into the outer LCP layer 472A-3 to contact the electrically conductive material of the intermediate circuit portion 474-B.

The outer circuit pattern and antenna pattern may be filled with electrically conductive material in an embodiment at block 816. For example, in an embodiment described with reference to FIG. 4B, an electrically conductive material may be disposed within the outer LCP layer 472A-3 to form an antenna 475-C capable of transmitting data at frequencies above 24 GHz, such as at 60 GHz in WiFi-6, embedded within the plurality of LCP layers (e.g., 472A-1, 472A-2, and 472A-3) of the LCP face plate. In another example embodiment described with reference to FIG. 4C, the electrically conductive material may be disposed within the outer LCP layer 472A-3 to form an outer circuit portion 474-C. Because the electrically conductive material of the intermediate circuit portion 474-B contacts the electrically conductive material of the inner circuit portion 474A and the outer circuit portion 474C, the inner circuit portion 474A, intermediate circuit portion 474B, and outer circuit portion 474C together may comprise a single circuit which may be electrically or operatively coupled to various hardware components housed within the interior of the wireless gaming keyboard or mouse adapter housing.

As described herein, this method may further include the molding and etching of additional LCP layers atop the outer LCP layer 472A-3 shown in FIG. 4B. As also described herein, this method may further be used to embed multiple antennas across the surface of the adapter housing face plate 472-A. For example, various embodiments contemplate at least the inclusion described with reference to FIG. 2 of a primary antenna 233a and a secondary or diversity antenna 233b, with one of the two antennas operating to transmit signals and the other of the two antennas operating to receive signals. In other embodiments, the primary antenna 233a may transmit and receive signals within a first frequency range and the secondary antenna 233b may transmit and receive signals within a second frequency range that does not overlap the first. Combinations of various numbers of such antennas are also contemplated in various embodiments. For example, various embodiments may incorporate 4×4 or 8×8 patch antenna arrays to enable multiple input multiple output (MIMO) and uplink MIMO communications. Other types of antennas such as patch antennas are contemplated in embodiments as well. In some embodiments, the outer circuit pattern or outer antenna pattern may be filled with an electrically conductive material at this point in the fabrication process.

An electro-magnetically transparent layer may be fusion bonded atop the outer LCP layer of the adapter housing, the electrical circuit, and the antenna in an embodiment at block 818. For example, in an embodiment described with reference to FIG. 3D, some embodiments may incorporate an electro-magnetically transparent top layer 371 adhered to the outer LCP layers for durability, shielding, insulation, or appearance.

At block 820, one or more electrical components may be mounted within the adapter housing in an embodiment. For example, in an embodiment described with reference to FIG. 3C, a USB-C adapter mounting, and controller executing code instructions of the wireless gaming keyboard and mouse adapter system may be mounted within the housing for the wireless gaming keyboard and adapter 370. As another example, a modem 377, integrated chip 376, and antenna front end system 378 of a network interface device may be mounted within the housing for the wireless gaming keyboard and adapter 370. Other electrical components, such as memory, transistors, or a USB-hub may also be mounted within the housing for the wireless gaming keyboard and adapter 370 in an embodiment.

The electrical components mounted within the housing in an embodiment may be electrically coupled via the electrical circuit embedded within the LCP layers of the adapter housing at block 822. As described with reference to FIG. 2, the USB connection 242 may operate according to the USB 3.1 protocol that allows for receipt of power at the hub 240 from the input/output device 241. This power may be transferred to the battery 224 or the power adapter 225 via the electrical circuit embedded within the LCP layer to provide power to the various components of the wireless gaming keyboard and mouse adapter 200, including the USB bus 240, the controller 279, the network interface device 201, or memory 204. Once power has been supplied in such a way, various electrical circuits may electrically couple various electrical components housed within the adapter. For example, in an embodiment described with reference to FIG. 3C, a first electrical circuit may electrically couple the USB-C adapter mounting 373-A to the controller 379, a second electrical circuit may electrically couple the controller 379 to the modem 377, a third electrical circuit may electrically couple the modem 377 to the antenna front end system 378, and a fourth electrical circuit may electrically couple the antenna front end system 378 to the antenna systems 376. Other data buses may be used with an additional power connection in some embodiments such as an integrated adapter.

At block 824, the network interface device may be electrically coupled to the antenna embedded within the LCP layers of the adapter housing. For example, in an embodiment described with reference to FIG. 2, the network interface device 201 may be communicatively coupled to an array of antenna systems (e.g., 233a and 233b) used to provide a plurality of separate communication channels to the network 252. The antennas (e.g., 233a and 233b) may support a 5G or Wi-Fi 6 wireless communication protocol so that relatively higher amounts of data may be transceived by the wireless gaming keyboard and mouse adapter 200 to any communication network (e.g., 252) to which the wireless gaming keyboard and mouse adapter 200 is communicatively coupled in some embodiments. The antennas (e.g., 233a and 233b) may be embedded within one or more layers of LCP material also housing circuits to operably couple one or more components of the wireless gaming keyboard and mouse adapter 200, such as, for example, the USB hub 240, the controller 279, and the network interface device 201. The method for fabricating a wireless gaming keyboard and mouse adapter housing with an embedded electrical circuit and antenna may then end.

Figure 9:
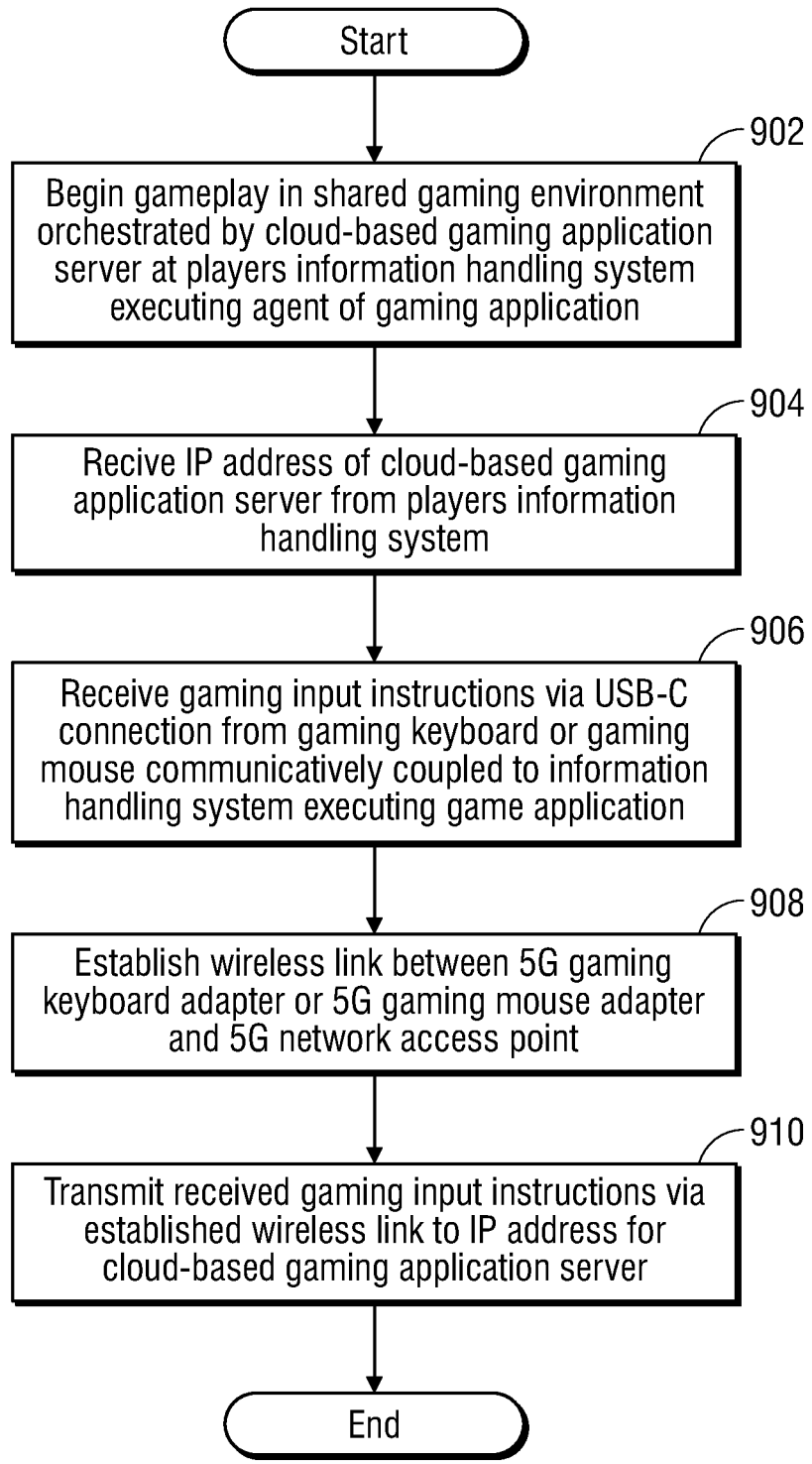
FIG. 9 is a flow diagram illustrating a method of transmitting input/output gaming instructions received from a peripheral input/output device to a cloud-based gaming server via a wireless network according to an embodiment of the present disclosure.

FIG. 9 is a flow diagram illustrating a method of transmitting input/output gaming instructions received from a peripheral input/output device to a cloud-based gaming server via a wireless network using an adapter incorporating an antenna embedded within a liquid crystal polymer adapter housing according to an embodiment of the present disclosure. As described herein, the wireless gaming keyboard and mouse adapter system in an embodiment may couple a wireless adapter to a gaming keyboard or a gaming mouse to bypass communication of input/output gaming instructions to a players' information handling system and communicate such input/output gaming instructions received via the gaming keyboard or gaming mouse more directly to a cloud-based server through a wireless network. The wireless gaming keyboard and mouse adapter system in embodiments described herein may omit the unnecessary transmission of such input/output gaming instructions to the player's information handling system, and then have the player's information handling system transmit those to the cloud-based gaming application server. Omission of such an unnecessary step may significantly limit or decrease lag between the player inputting such input/output gaming instructions via the peripheral input/output device, and the player's display device reflecting the impact those input/output gaming instructions have on the gaming environment hosted by the cloud-based gaming application server.

At block 902, a player may begin gameplay in a shared gaming environment orchestrated by the cloud-based gaming application server at the player's information handling system executing an agent of the gaming application. For example, in an embodiment described with reference to FIG. 1, a player's information handling system 100 may execute an agent 191 of the gaming software application that is orchestrated at a cloud-based server located within network 140. In such an embodiment, the players' information handling system 100 may be tasked primarily with the display of a gaming environment via a video display 115 during the gameplay initiated by the player at block 902. As another example, in an embodiment described with reference to FIG. 2, the gaming application server 253 may control or orchestrate a community or shared gaming environment including a plurality of player avatars, with each player avatar controlled by a separate input/output device (e.g., 241). The gaming application server 253 may transmit display instructions for displaying the shared gaming environment to a player information handling system 254 via the network 252.

An IP address of the cloud-based gaming application server may be received from the player's information handling system in an embodiment at block 904. For example, in an embodiment described with reference to FIG. 1, the cloud-based gaming application agent 191 may also operate to retrieve an IP address of the cloud-based gaming application server, and to transmit this IP address to the input/output device 180 via bus 109. As another example, in an embodiment described with reference to FIG. 2, the coding instructions 262 of the wireless gaming keyboard and mouse adapter system 260 may operate to retrieve, via input/output device 241, an IP address of a cloud-based gaming application server generating a gaming environment for display on a remote operating system 254 in communication with the input/output device 241. The wireless gaming keyboard and mouse adapter system 260 in such an embodiment may receive the IP address for the cloud-based gaming application server via a wired Universal Serial Bus (USB) connection 242 to the input/output device 241, for example. The controller 279 may receive this IP address via the USB hub 240, and execute code instructions 262 of the wireless gaming keyboard and mouse adapter system 260 to direct the network interface device 201 to forward receiving player input input/output gaming instructions to the IP address for the cloud-based gaming applications server 253.

At block 906, input/output gaming instructions input by a player into the gaming keyboard (or other input/output device) to which the wireless gaming keyboard or mouse adapter is mated may be received via a USB-C connection in an embodiment. For example, in an embodiment described with reference to FIG. 5B, the wireless gaming keyboard and mouse adapter 570-A may be coupled to the gaming keyboard 510 via a USB-C port for the gaming keyboard 510. More specifically, the USB-C adapter 512 of the gaming keyboard 510 may insert into the USB-C adapter 573-B of the wireless gaming keyboard and mouse adapter 570-A. The USB-C adapter 573-B may mechanically couple to a USB-C adapter 512 of the keyboard 510 to form a USB-C connection between the wireless gaming keyboard and mouse adapter 570-A and a controller of the keyboard 510. The keyboard controller operably connected to the USB-C adapter 512 via the input/output controller line 513 in an embodiment may register keystrokes or movement of the keys 511 of the keyboard 510. The USB-C adapter mounting 573-A may receive player input/output gaming instructions in the form of indications of such keystrokes received from the keyboard controller via the controller line 513 and this USB-C connection. The method may then proceed to block 916 for transmission of the received input/output gaming instructions to the cloud-based gaming application server.

The wireless gaming keyboard and mouse adapter system in an embodiment may direct the network interface device to establish a wireless link with a wireless network access point via the antenna embedded within the front plate of the adapter housing at block 908. For example, in an embodiment described with reference to FIG. 2, the coding instructions 262 of the wireless gaming keyboard and mouse adapter system 260 may, according to the present description, operate to retrieve an IP address of a cloud-based gaming application server 253 generating a gaming environment for display on a remote operating system 254 executing an agent or sub-portion of the gaming application hosted at the cloud-based server 253. The wireless gaming keyboard and mouse adapter system 260 in such an embodiment may receive the IP address for the cloud-based gaming application server via a wired Universal Serial Bus (USB) connection 242 to the input/output device 241, for example. The controller 279 may receive this IP address via the USB hub 240, and execute code instructions 262 of the wireless gaming keyboard and mouse adapter system 260 to direct the network interface device 201 to forward receiving player input/output gaming instructions to the IP address for the cloud-based gaming applications server 253.

The network interface device 201 may provide connectivity of the wireless gaming keyboard and mouse adapter 200 to the network 252 via a network AP 251 in an embodiment. In an embodiment, the network interface device 201 may be communicatively coupled to an array of antenna systems (e.g., 233a or 233b) used to provide a plurality of separate communication channels to the network 252. The antennas (e.g., 233a or 233b) may be embedded within one or more layers of LCP material housing one or more components of the wireless gaming keyboard and mouse adapter 200, such as, for example, the USB hub 240, the controller 279, and the network interface device 201.

In another example embodiment described with reference to FIG. 7, the gaming keyboard 770 coupled with a wireless gaming keyboard or mouse adapter (e.g., as described above with respect to FIGS. 4A and 4B and at block 910 of FIG. 9) may establish a wireless link 771 via the network interface device of the wireless gaming keyboard or mouse adapter with the wireless network AP 711, for example. In another example, the gaming mouse 780 may incorporate a wireless gaming keyboard or mouse adapter (e.g., as described above with respect to FIGS. 5A, 5B, and 5C), which may establish a wireless link 781 via the network interface device of the wireless gaming keyboard or mouse adapter with the wireless network AP 712.

At block 910, the network interface device may transmit the received input/output gaming instructions via the established wireless link with the wireless network AP to the cloud-based gaming application server. For example, in an embodiment described with reference to FIG. 1, an input/output device controller 183 in an embodiment may operate to detect actuation of one or more mechanical, electrical, or electromagnetic devices, as they are physically manipulated by a user, and to generate input/output gaming instructions, based on these detected actuations. More specifically, the input/output device controller 183 may detect actuation of a keyboard key associated with firing a weapon and consequently generate an input/output gaming instruction directing the player's avatar to fire a weapon within the gaming environment generated by the cloud-based gaming application server. As described in another embodiment with respect to FIG. 2, the coding instructions 262 of the wireless gaming keyboard and mouse adapter system 260 in an embodiment may operate to receive those input/output gaming instructions from the input/output device 241 via USB hub 240 and transmit those input/output gaming instructions to the network interface device 201. Controller 279 for the wireless gaming keyboard and mouse adapter 200 in such an embodiment may also transmit to the network interface device 201 the IP address and any other information needed by the network interface device 201 to establish a connection to the cloud-based gaming application server located within network 252, and to forward input/output gaming instructions on to the network 252 via an antenna system 233a or 233b.

The modem 232 may transmit these input/output gaming instructions to the radio frequency transceiver 232b, which may modulate radio frequency signals to carry the input/output gaming instructions received from the modem 232a. Such a modulated radio frequency signal may then be transmitted through a radio frequency (RF) line to the antenna front end system 231 of the network interface device 201. The antenna front end system 231 may operate to, set signal transmission power levels or sensitivity to signal reception, select channels or frequency bands, and conduct other functions in support of a wireless transmission from the information handling system to the communication network via one or more antennas (e.g., primary antenna 233a or diversity antenna 233b). The primary antenna 233a, diversity antenna 233b, or other antennas may then transmit the input/output gaming instructions to the cloud-based gaming application server in an embodiment, via a wireless network AP.

In yet another example embodiment described with reference to FIG. 7, input/output gaming instructions input into the gaming keyboard 770 may be transmitted to the wireless gaming keyboard or mouse adapter via a USB-C connection, and transmitted from the wireless gaming keyboard or mouse adapter to the wireless network AP 711 via wireless link 771. In another example, input/output gaming instructions input into the gaming mouse 780 may be transmitted to the wireless gaming keyboard or mouse adapter via a USB-C connection, and transmitted from the wireless gaming keyboard or mouse adapter to the wireless network AP 712 via wireless link 781. Digital displays 711 and 712, acting as wireless network APs in such an embodiment may transmit such input/output gaming instructions to the cloud-based gaming server 740 via hardline connections to network 705. This may omit communication of such input/output gaming instructions to the players' information handling systems displaying the gaming environment, and thus avoid any lag associated with such an unnecessary hop.

In such a way, the wireless gaming keyboard and mouse adapter system may enable transmission of input/output gaming instructions to a cloud-based gaming server, without communications through an intermediate information handling system, via an antenna embedded within an LCP face plate of a small form-factor adapter mated directly to a gaming keyboard or incorporated within a gaming keyboard or a gaming mouse. The method for transmitting player input/output gaming instructions to a cloud-based gaming application server via a wireless network may then end.

The blocks of the flow diagrams of FIGS. 8-9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless gaming keyboard and mouse adapter system comprising:
    a wireless gaming keyboard and mouse adapter housing, forming a dongle operably coupled to an input/output device, within which an electrical circuit and an antenna are embedded within a plurality of liquid crystal polymer (LCP) layers;
    a network interface device, a Universal Serial Bus (USB)-C adapter mounting, and a controller housed within the wireless gaming keyboard and mouse adapter housing electrically coupled via the electrical circuit;
    the network interface device electrically coupled to the antenna;
    the controller receiving input/output gaming instructions for a gaming software application, via the USB-C adapter mounting, from the input/output device for a remote information handling system executing an agent of the gaming software application, via a USB-C connection;
    the controller configured for execution of wireless gaming keyboard and mouse adapter system code instructions to direct the network interface device to transceive the input/output gaming instructions to a cloud-based server orchestrating the gaming software application via a wireless network Access Point (AP) at frequencies above 24 GHz.

2. The wireless gaming keyboard and mouse adapter of claim 1, wherein the USB-C connection adheres to the USB 3.1 standard.

3. The wireless gaming keyboard and mouse adapter of claim 1, wherein the network interface device is electrically coupled to a plurality of antennas for communication according to the multiple input multiple output (MIMO) 5G standard.

4. The wireless gaming keyboard and mouse adapter of claim 1, wherein the antenna transceives the input/output gaming instructions at frequencies above 24 GHz.

5. The wireless gaming keyboard and mouse adapter of claim 1, wherein the antenna transceives the input/output gaming instructions at frequencies above 60 GHz.

6. The wireless gaming keyboard and mouse adapter of claim 1, wherein the input/output device is a keyboard receiving the input/output gaming instructions in the form of keystrokes.

7. The wireless gaming keyboard and mouse adapter of claim 1, wherein the input/output device is a mouse receiving the input/output gaming instructions in the form of mouse clicks or movements of the mouse.

8. A method for fabricating a wireless gaming keyboard and mouse adapter comprising:
    injection molding a liquid crystal polymer (LCP) ceiling, an LCP left side wall, an LCP right side wall, an LCP floor, and an inner LCP layer of an adapter housing face plate;
    etching a first antenna electrical circuit pattern into the inner LCP layer;
    filling the first antenna electrical circuit pattern with an electrically conductive material to form a first antenna electrical circuit;
    injection molding an intermediate LCP layer atop the inner LCP layer;
    etching a first antenna via contacting the electrically conductive material disposed within the first antenna electrical circuit pattern through the intermediate LCP layer;
    filling the first antenna via with the electrically conductive material to form a first antenna lead;
    injection molding an outer LCP layer atop the intermediate LCP layer;
    etching a first antenna pattern contacting the electrically conductive material disposed within the first antenna via into the outer LCP layer;
    filling the first antenna pattern with the electrically conductive material to form a first antenna embedded within an adapter housing face plate formed by the inner LCP layer, intermediate LCP layer, and outer LCP layer, for transceiving received input/output gaming instructions at frequencies greater than 24 GHz; and
    electrically coupling the first antenna and a network interface device via the first antenna electrical circuit and the first antenna lead.

9. The method of claim 8 further comprising:
    etching a second antenna electrical circuit pattern into the inner LCP layer;
    filling the second antenna electrical circuit pattern with the electrically conductive material;
    etching a second antenna via contacting the electrically conductive material disposed within the second antenna electrical circuit pattern through the intermediate LCP layer;
    filling the second antenna via with the electrically conductive material;
    etching a second antenna pattern contacting the electrically conductive material disposed within the second antenna via into the outer LCP layer;

filling the second antenna pattern with the electrically conductive material to form a second antenna.

10. The method of claim 8 further comprising:
etching a first inner circuit pattern into the inner LCP layer;
filling the first inner circuit pattern with the electrically conductive material;
etching a second via contacting the electrically conductive material disposed within the first inner circuit pattern through the intermediate LCP layer;
filling the second via with the electrically conductive material;
etching a first outer circuit pattern contacting the electrically conductive material disposed within the second via into the outer LCP layer;
filling the first outer circuit pattern with the electrically conductive material to form a first electrical circuit electrically coupling a USB-C adapter mounting with the network interface device and a controller executing code instructions for a wireless gaming keyboard and mouse adapter system to receive input/output gaming instructions via the USB-C adapter mounting and transmit the input/output gaming instructions via the network interface device and the first antenna.

11. The method of claim 8, wherein the first antenna is a 4×4 patch antenna array for multiple input multiple output (MIMO) signal reception and transmission.

12. The method of claim 8, wherein the first antenna is an 8×8 patch antenna array for multiple input multiple output (MIMO) signal reception and transmission.

13. The method of claim 8, wherein the first antenna transceives data at frequencies above 24 GHz.

14. The method of claim 8, wherein the first antenna transceives data at frequencies above 60 GHz.

15. A wireless gaming keyboard and mouse adapter system comprising:
a wireless gaming keyboard and mouse adapter housing, incorporated within the housing of an input/output device for a remote information handling system executing an agent of a gaming software application, within which an electrical circuit and an antenna are embedded within a plurality of liquid crystal polymer (LCP) layers;
a network interface device, a Universal Serial Bus (USB)-C adapter mounting, and a controller housed within the wireless gaming keyboard and mouse adapter housing, electrically coupled via the electrical circuit;
the network interface device electrically coupled to the antenna;
the controller receiving input/output gaming instructions for the gaming software application, via the USB-C adapter mounting, from the input/output device, via a USB-C connection;
the controller configured for execution of wireless gaming keyboard and mouse adapter system code instructions to direct the network interface device to transceive the input/output gaming instructions to a cloud-based server orchestrating the gaming software application via a wireless network Access Point (AP) at frequencies above 24 GHz.

16. The wireless gaming keyboard and mouse adapter of claim 15, wherein the USB-C connection adheres to the USB 3.1 standard.

17. The wireless gaming keyboard and mouse adapter of claim 15, wherein the antenna is a 4×4 patch antenna array for multiple input multiple output (MIMO) signal reception and transmission.

18. The wireless gaming keyboard and mouse adapter of claim 15, wherein the antenna is an 8×8 patch antenna array for multiple input multiple output (MIMO) signal reception and transmission.

19. The wireless gaming keyboard and mouse adapter of claim 15, wherein the input/output device is a keyboard receiving the input/output gaming instructions in the form of keystrokes.

20. The wireless gaming keyboard and mouse adapter of claim 15, wherein the input/output device is a mouse receiving the input/output gaming instructions in the form of mouse clicks or movements of the mouse.

* * * * *